(12) United States Patent  
Zhang et al.

(10) Patent No.: US 11,601,178 B2  
(45) Date of Patent: Mar. 7, 2023

(54) CHANNEL STATE INFORMATION TRANSMISSION METHOD AND APPARATUS

(71) Applicant: Huawei Technologies Co., Ltd., Shenzhen (CN)

(72) Inventors: Di Zhang, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 40 days.

(21) Appl. No.: 17/173,001

(22) Filed: Feb. 10, 2021

(65) Prior Publication Data

US 2021/0167831 A1    Jun. 3, 2021

Related U.S. Application Data

(63) Continuation of application No. PCT/CN2019/099470, filed on Aug. 6, 2019.

(30) Foreign Application Priority Data

Aug. 10, 2018   (CN) .......................... 201810912281.6

(51) Int. Cl.
*H04B 7/06* (2006.01)
*H04B 17/318* (2015.01)
(Continued)

(52) U.S. Cl.
CPC ......... *H04B 7/0626* (2013.01); *H04B 17/318* (2015.01); *H04B 17/345* (2015.01); *H04L 5/0048* (2013.01)

(58) Field of Classification Search
CPC .................................................. H04B 7/0626
See application file for complete search history.

(56) References Cited

U.S. PATENT DOCUMENTS

2013/0223251 A1    8/2013   Li et al.
2014/0185528 A1*   7/2014   Shimezawa ........... H04W 52/42
                                                           370/328
(Continued)

FOREIGN PATENT DOCUMENTS

CN          1874261 A    12/2006
CN        107873127 A     4/2018
(Continued)

OTHER PUBLICATIONS

"Technical Specification Group Radio Access Network; NR; Physical layer procedures for data (Release 15)," 3GPP TS 38.214 V15.2.0, 3rd Generation Partnership Project, total 95 pages, 3rd Generation Partnership Project, Valbonne, France (Jun. 2018).

*Primary Examiner* — Hsinchun Liao
(74) *Attorney, Agent, or Firm* — Leydig, Voit & Mayer, Ltd.

(57) ABSTRACT

This application provides a method which includes: receiving, by a terminal, N reference signal groups, where each of the N reference signal groups includes at least two reference signals that are simultaneously received; and sending indication information used to indicate channel state information of at least one reference signal in each of K reference signal groups. Therefore, the terminal can feed back the channel state information of the reference signal in a scenario in which a plurality of reference signals can be simultaneously received, so that a network device selects a beam from a plurality of beams that can be simultaneously sent to send data.

17 Claims, 6 Drawing Sheets

(51) Int. Cl.
*H04B 17/345* (2015.01)
*H04L 5/00* (2006.01)

(56) References Cited

U.S. PATENT DOCUMENTS

2019/0288807 A1* 9/2019 Zhang .................. H04L 1/0003
2021/0036815 A1    2/2021 Gao et al.

FOREIGN PATENT DOCUMENTS

| CN | 108111278  A | 6/2018 |
| CN | 108242944  A | 7/2018 |
| WO | 2018124846 A1 | 7/2018 |

* cited by examiner

CHANNEL STATE INFORMATION TRANSMISSION METHOD AND APPARATUS

CROSS-REFERENCE TO RELATED APPLICATIONS

This application is a continuation of International Application No. PCT/CN2019/099470, filed on Aug. 6, 2019, which claims priority to Chinese Patent Application No. 201810912281.6, filed on Aug. 10, 2018. The disclosures of the aforementioned applications are hereby incorporated by reference in their entireties.

TECHNICAL FIELD

This application relates to the communications field, and more specifically, to a channel state information transmission method and an apparatus.

BACKGROUND

In a conventional solution, in a beam training process, a terminal measures communication quality of a plurality of beams configured by a network device, and reports information about a beam with relatively high communication quality to the network device. The network device may also configure a maximum quantity of beams reported by the terminal, and the terminal may report information about a beam whose quantity is less than or equal to the maximum quantity of beams.

In this way, the network device may communicate with the terminal on each optimal beam. However, as a data amount increases, communication efficiency is relatively low in the conventional solution.

SUMMARY

This application provides a channel state information transmission method and an apparatus, to improve communication efficiency.

According to a first aspect, a channel state information transmission method is provided. The method includes: receiving N reference signal groups, where each of the N reference signal groups includes at least two reference signals, the at least two reference signals are reference signals that are simultaneously received, N≥1, and N is an integer; and sending indication information, where the indication information indicates channel state information of at least one reference signal in each of K reference signal groups, the K reference signal groups are at least one of the N reference signal groups, 1≤K≤N, and K is an integer.

A terminal receives the N reference signal groups, where each of the N reference signal groups includes M reference signals that are simultaneously received; and sends the indication information used to indicate the channel state information of the at least one reference signal in each of the K reference signal groups. Therefore, the terminal can feed back the channel state information of the reference signal in a scenario in which a plurality of reference signals can be simultaneously received, so that a network device selects a beam from a plurality of beams that can be simultaneously sent to send data. In this way, when a quantity of selected beams is greater than 1, communication efficiency is improved; when a beam with high communication quality is selected from the plurality of beams, communication quality can be improved; and when the channel state information of the at least one reference signal is fed back, if a quantity of the at least one reference signal is less than a total quantity of corresponding reference signal groups, signaling overheads can be reduced.

Optionally, the foregoing method may alternatively be described as follows:

obtaining N reference signal groups, where each of the N reference signal groups includes at least two reference signals, the at least two reference signals are reference signals that are simultaneously received, N≥1, and N is an integer; and sending indication information, where the indication information indicates channel state information of at least one reference signal in each of K reference signal groups, the K reference signal groups are at least one of the N reference signal groups, 1≤K≤N, and K is an integer.

For example, the terminal receives P reference signals, and generates the N reference signal groups.

In some embodiments, the channel state information of the at least one reference signal in a $i^{th}$ reference signal group in the K reference signal groups is channel state information of Li reference signals, 1≤i≤K, 1≤Li≤M, i, Li, and M are all integers, M is a quantity of all reference signals included in a $i^{th}$ reference signal group, and the channel state information of the Li reference signals includes at least one of the following content: X reference signal resource indexes, Y pieces of reference signal received quality RSRQ, or a quantity of reference signals, where X≤Li, and Y≤Li.

When a quantity of reference signal resource indexes is less than a quantity of reference signals whose channel state information needs to be reported, or an amount of RSRQ of a reference signal is less than a quantity of reference signals whose channel state information needs to be reported, a quantity of bits occupied by the indication information can be reduced, thereby reducing signaling overheads.

In some embodiments, the channel state information of the at least one reference signal in a $i^{th}$ reference signal group in the K reference signal groups is channel state information of Li reference signals, 1≤i≤K, 1≤Li≤M, i, Li, and M are all integers, M is a quantity of all reference signals included in a $i^{th}$ reference signal group, and the channel state information of the Li reference signals includes at least one of the following content: X reference signal resource indexes, Z signal to interference plus noise ratios SINRs, or a quantity of reference signals, where X≤Li, and Z≤Li.

When a quantity of reference signal resource indexes is less than a quantity of reference signals whose channel state information needs to be reported, or a quantity of SINRs of a reference signal is less than a quantity of reference signals whose channel state information needs to be reported, a quantity of bits occupied by the indication information can be reduced, thereby reducing signaling overheads.

In some embodiments, the method further includes: determining the K reference signal groups and/or the channel state information of the at least one reference signal in each of the K reference signal groups based on channel quality of reference signals in the N reference signal groups.

The terminal may determine, based on the channel quality of the reference signals in the N reference signal groups, reference signals whose channel state information is carried in the indication information. For example, the terminal may determine reference signal groups and reference signals in a reference signal group, so that the indication information carries channel state information of a reference signal with high communication quality, and the network device can send data on a beam corresponding to the reference signal with high communication quality, to improve communication quality.

In some embodiments, the method further includes: determining the K reference signal groups and/or the channel state information of the at least one reference signal in each of the K reference signal groups based on channel quality of reference signals in the N reference signal groups and a transmission mode.

The terminal may determine, based on the channel quality of the reference signals in the N reference signal groups and a quantity of reference signals that are simultaneously transmitted that is indicated by the transmission mode, reference signals whose channel state information is carried in the indication information, so that the indication information carries channel state information of a reference signal with high communication quality, and the network device can send data on a beam corresponding to the reference signal with high communication quality, to improve communication quality.

In some embodiments, the method further includes: determining the K reference signal groups and/or the channel state information of the at least one reference signal in each of the K reference signal groups based on a transmission mode.

If a quantity of transmit beams that is indicated by the transmission mode is the quantity of all reference signals included in the reference signal group, the terminal can choose to use only the indication information to carry channel state information of all the reference signals in the reference signal group.

In some embodiments, the method further includes: determining the K reference signal groups and/or the at least one reference signal in each of the K reference signal groups based on channel quality of at least one subset in each of at least one reference signal group in the N reference signal groups.

One reference signal group (for example, a first reference signal group) includes a plurality of reference signals, and any at least one of the plurality of reference signals is combined into a subset in the first reference signal group. The terminal may select one target subset in each reference signal group based on channel quality of all subsets in each of the N reference signal groups, then select the K reference signal groups from the N reference signal groups based on channel quality of the target subset in each reference signal group, and send, to the network device by using the indication information, channel state information of reference signals included in target subsets in the K reference signal groups. In this way, the network device may simultaneously send data based on beams corresponding to the reference signals in the target subsets. In other words, the terminal recommends, to the network device, the transmission mode in which the network device sends the data, to improve communication quality.

In some embodiments, the method further includes: determining the K reference signal groups based on channel quality of at least one subset in each reference signal group of at least one reference signal group in the N reference signal groups and a transmission mode.

A quantity included in a target subset selected by the terminal can only be a quantity of transmit beams that is indicated by the transmission mode. In this case, the terminal needs to select the target subset only based on channel quality of a subset that is in each reference signal group and that includes the quantity of transmit beams that is indicated by the transmission mode, to prevent the terminal from reporting channel state information that is of a reference signal and that is not required by the network device, thereby reducing signaling overheads.

In some embodiments, the channel quality is RSRQ or an SINR.

In some embodiments, when Li is equal to 1, the method further includes: determining first RSRQ of a first reference signal in a $i^{th}$ reference signal group based on a first reference signal received power RSRP and a first received signal strength indicator RSSI, where the first RSRP is obtained by performing RSRP measurement on a reference signal resource on which the first reference signal is located; the first RSSI is obtained by performing RSSI measurement on the reference signal resource on which the first reference signal is located.

In some embodiments, when Li is equal to 1, the method further includes: determining first RSRQ of a first reference signal in a $i^{th}$ reference signal group based on a first reference signal received power RSRP and a first received signal strength indicator RSSI, where the first RSRP is obtained by performing RSRP measurement on a reference signal resource on which the first reference signal is located; the first RSSI is obtained by performing RSSI measurement on reference signal resources on which the first reference signal and a second reference signal are located; and the second reference signal is different from the Li reference signals in a $i^{th}$ reference signal group.

The first RSRQ may be: First RSRQ=First RSRP/First RSSI.

In some embodiments, when Li is equal to 1, the method further includes: determining a first SINR of a first reference signal in a $i^{th}$ reference signal group based on first channel information and first interference information, where the first channel information is obtained by performing channel measurement on a reference signal resource on which the first reference signal is located; the first interference information is obtained by performing interference measurement on a reference signal resource on which the first reference signal or a second reference signal is located; and the second reference signal does not belong to a $i^{th}$ reference signal group.

It is determined, based on the first channel information S and the first interference information I, that the first SINR of the first reference signal may be: SINR=S/I.

In some embodiments, when Li is greater than 1, the method further includes: determining RSRQ of the $j^{th}$ reference signal in the Li reference signals based on a second RSRP and a second RSSI, where the second RSRP is obtained by performing RSRP measurement on a reference signal resource on which the $j^{th}$ reference signal is located; the second RSSI is obtained by performing RSSI measurement on reference signal resources on which the Li reference signals are located; the second reference signal is different from the Li reference signals in a $i^{th}$ reference signal group; and the $j^{th}$ reference signal is any one of the Li reference signals, and j is an integer.

The $j^{th}$ reference signal is the any one of the Li reference signals. In this way, corresponding RSRQ may be determined for each of the Li reference signals in a manner of determining the RSRQ of the $i^{th}$ reference signal. The second RSSI is obtained by performing RSSI measurement on the reference signal resources on which the Li reference signals are located, that is, mutual interference between the Li reference signals needs to be considered, to accurately determine communication quality of each reference signal, and further improve communication quality.

In some embodiments, when Li is greater than 1, the method further includes: determining RSRQ of the $j^{th}$ reference signal in the Li reference signals based on a second RSRP and a second RSSI, where the second RSRP is obtained by performing RSRP measurement on a reference signal resource on which the $j^{th}$ reference signal is located; the second RSSI is obtained by performing RSSI measurement on reference signal resources on which the Li reference signals and a second reference signal are located; the second reference signal is different from the Li reference signals in a $i^{th}$ reference signal group; and the $j^{th}$ reference signal is any one of the Li reference signals, and j is an integer.

The $j^{th}$ reference signal is the any one of the Li reference signals. In this way, corresponding RSRQ may be determined for each of the Li reference signals in a manner of determining the RSRQ of the $j^{th}$ reference signal. During measurement of the second RSSI, impact of another cell on the terminal further needs to be considered, to more accurately determine communication quality of each reference signal, and further improve communication quality.

In some embodiments, when Li is greater than 1, the method further includes: determining an SINR of the $j^{th}$ reference signal in the Li reference signals based on second channel information and second interference information, where the second channel information is obtained by performing channel measurement on a reference signal resource on which the $j^{th}$ reference signal is located; the second interference information is obtained by performing interference measurement on reference signal resources on which the Li reference signals are located; the second reference signal is different from the Li reference signals in a $i^{th}$ reference signal group; and the $j^{th}$ reference signal is any one of the Li reference signals, and j is an integer.

The $j^{th}$ reference signal is the any one of the Li reference signals. In this way, a corresponding SINR may be determined for each of the Li reference signals in a manner of determining the SINR of the $j^{th}$ reference signal.

In some embodiments, when Li is greater than 1, the method further includes: determining an SINR of the $j^{th}$ reference signal in the Li reference signals based on second channel information and second interference information, where the second channel information is obtained by performing channel measurement on a reference signal resource on which the $j^{th}$ reference signal is located; the second interference information is obtained by performing interference measurement on a reference signal resource on which a reference signal other than the $j^{th}$ reference signal in the Li reference signals is located; the second reference signal is different from the Li reference signals in a $i^{th}$ reference signal group; and the $j^{th}$ reference signal is any one of the Li reference signals, and j is an integer.

The $j^{th}$ reference signal is the any one of the Li reference signals. In this way, a corresponding SINR may be determined for each of the Li reference signals in a manner of determining the SINR of the $j^{th}$ reference signal. The interference information is obtained by performing RSSI measurement on reference signal resources on which the Li reference signals are located, that is, mutual interference between the Li reference signals needs to be considered, to accurately determine communication quality of each reference signal, and further improve communication quality.

In some embodiments, the $j^{th}$ reference signal is any one of the Li reference signals. In this way, a corresponding SINR may be determined for each of the Li reference signals in a manner of determining an SINR of the $j^{th}$ reference signal. The interference information is obtained by measuring a reference signal resource on which a reference signal other than the $j^{th}$ reference signal in the Li reference signals is located, that is, mutual interference between the Li reference signals needs to be considered, to accurately determine communication quality of each reference signal, and further improve communication quality.

In some embodiments, when Li is greater than 1, the method further includes: determining an SINR of the $j^{th}$ reference signal in the Li reference signals based on second channel information and second interference information, where the second channel information is obtained by performing channel measurement on a reference signal resource on which the $j^{th}$ reference signal is located; the second interference information is obtained by performing interference measurement on reference signal resources on which a reference signal other than the $j^{th}$ reference signal in the Li reference signals and a second reference signal are located; the second reference signal is different from the Li reference signals in a $i^{th}$ reference signal group; and the $j^{th}$ reference signal is any one of the Li reference signals, and j is an integer.

During measurement of the interference information, mutual interference between the Li reference signals and impact of another cell on the terminal need to be considered, to more accurately determine communication quality of each reference signal, and further improve communication quality.

In some embodiments, when Li is greater than 1, the method further includes:

determining third RSRQ based on Li third RSRPs and a third RSSI, where each of the Li third RSRPs is obtained by performing RSRP measurement on a reference signal resource on which each of the Li reference signals is located; the third RSSI is obtained by performing RSSI measurement on reference signal resources on which the Li reference signals and a second reference signal are located; and the second reference signal does not belong to the N reference signal groups.

The terminal may directly obtain the third RSRQ through measurement based on the Li third RSRPs and the third RSSI, where the third RSRQ may be considered as equivalent RSRQ of the Li reference signals.

In some embodiments, when Li is greater than 1, the method further includes:

determining third RSRQ based on Li third RSRPs and a third RSSI, where each of the Li third RSRPs is obtained by performing RSRP measurement on a reference signal resource on which each of the Li reference signals is located; the third RSSI is obtained by performing RSSI measurement on reference signal resources on which the Li reference signals are located; and the second reference signal does not belong to the N reference signal groups.

In some embodiments, when Li is greater than 1, the method further includes: determining the third SINR based on Li pieces of third channel information and third interference information, where each of the Li pieces of third channel information is obtained by performing channel measurement on a reference signal resource on which one of the Li reference signals is located; the third interference information is obtained by performing interference measurement on reference signal resources on which the Li reference signals and a second reference signal are located; and the second reference signal is different from the Li reference signals in a $i^{th}$ reference signal group.

The terminal may directly obtain the third SINR through measurement based on the Li third RSRPs and the third RSSI, where the third SINR may be considered as equivalent RSRQ of the Li reference signals.

In some embodiments, when Li is greater than 1, the method further includes: determining the third SINR based on Li pieces of third channel information and third interference information, where each of the Li pieces of third channel information is obtained by performing channel measurement on a reference signal resource on which one of the Li reference signals is located; the third interference information is obtained by performing interference measurement on reference signal resources on which the Li reference signals are located; and the second reference signal is different from the Li reference signals in a $i^{th}$ reference signal group.

In some embodiments, when Li is greater than 1, the method further includes:

determining fourth RSRQ based on a fourth RSRP and a fourth RSSI, where the fourth RSRP is a maximum value in Li RSRPs that is obtained by performing RSRP measurement on each of the Li reference signals; the fourth RSSI is obtained by performing RSSI measurement on reference signal resources on which the Li reference signals and a second reference signal are located; and the second reference signal does not belong to the N reference signal groups.

The terminal may determine the fourth RSRQ based on the maximum RSRP in the RSRPs of the Li reference signals and the fourth RSSI, where the fourth RSRQ may be considered as equivalent RSRQ of the Li reference signals.

In some embodiments, when Li is greater than 1, the method further includes:

determining fourth RSRQ based on a fourth RSRP and a fourth RSSI, where the fourth RSRP is a maximum value in Li RSRPs that is obtained by performing RSRP measurement on each of the Li reference signals; the fourth RSSI is obtained by performing RSSI measurement on reference signal resources on which the Li reference signals are located; and the second reference signal does not belong to the N reference signal groups.

In some embodiments, when Li is greater than 1, the method further includes:

determining the fourth SINR based on fourth channel information and fourth interference information, where the fourth channel information is a maximum value in Li pieces of channel information that is obtained by performing channel measurement on a reference signal resource on which each of the Li reference signals is located; the fourth interference information is obtained by performing interference measurement on reference signal resources on which the Li reference signals and a second reference signal are located; and the second reference signal is different from the Li reference signals in a $i^{th}$ reference signal group.

The terminal may determine the fourth SINR based on the maximum channel information in the channel information of the Li reference signals and the fourth interference information, where the fourth SINR may be considered as an equivalent SINR of the Li reference signals.

In some embodiments, when Li is greater than 1, the method further includes:

determining the fourth SINR based on fourth channel information and fourth interference information, where the fourth channel information is a maximum value in Li pieces of channel information that is obtained by performing channel measurement on a reference signal resource on which each of the Li reference signals is located; the fourth interference information is obtained by performing interference measurement on reference signal resources on which the Li reference signals are located; and the second reference signal is different from the Li reference signals in a $i^{th}$ reference signal group.

In some embodiments, the X reference signal resource indexes and/or the Y pieces of RSRQ in the indication information and the quantity of reference signals that is in the indication information are separately encoded.

The indication information may include two parts. A first part is the quantity of reference signals, and a second part is the X reference signal resource indexes and/or the Y pieces of RSRQ. When parsing the indication information, the network device may first parse the first part, and then parse the second part. In this way, the network device may determine, based on the quantity of reference signals that is first obtained through parsing, a size of a resource that needs to be used to parse the second part, to avoid a resource waste caused by uniformly parsing all the content of the indication information by using a fixed resource. To be specific, resource overheads of parsing the indication information by the network device can be reduced through separate encoding.

In some embodiments, the X reference signal resource indexes and/or the Z SINRs in the indication information and the quantity of reference signals that is in the indication information are separately encoded.

The indication information may include two parts. A first part is the quantity of reference signals, and a second part is the X reference signal resource indexes and/or the Z SINRs. When parsing the indication information, the network device may first parse the first part, and then parse the second part. In this way, the network device may determine, based on the quantity of reference signals that is first obtained through parsing, a size of a resource that needs to be used to parse the second part, to avoid a resource waste caused by uniformly parsing all the content of the indication information by using a fixed resource. To be specific, resource overheads of parsing the indication information by the network device can be reduced through separate encoding.

In some embodiments, X<Li when the Li reference signals have a mapping relationship.

The indication information may carry indexes less than those of the Li reference signals, thereby reducing signaling overheads.

In some embodiments, the method further includes:

receiving configuration information, where the configuration information indicates W resource sets used for channel measurement, each of the W resource sets includes a plurality of reference signals, and reference signals in a first resource set in the W resource sets are one-to-one mapped to reference signals in each of resource sets other than the first resource set in the W resource set; the first resource set is any one of the W resource sets; and W≥2, and W is an integer; and determining reference signals having a mapping relationship as one of the N reference signal groups.

The network device sends the configuration information. The configuration information indicates the W resource sets used for channel measurement, and each resource set includes the plurality of reference signals. Different resource sets may include a same quantity of reference signals, or may include different quantities of reference signals. There is a mapping relationship between reference signals included in any resource set (for example, the first resource set) in the W resource sets and reference signals in at least one of resource sets other than the first resource set. In this way, the terminal receives the configuration information flexibly configured by the network device, thereby improving flexibility of configuring the reference signal group by the network device.

In some embodiments, the method further includes:

receiving configuration information, where the configuration information indicates W resource configurations used for channel measurement, each of the W resource configurations includes a plurality of reference signal resources, and reference signal resources in a first resource configuration in the W resource configurations are one-to-one mapped to reference signal resources in each of resource configurations other than the first resource configuration in the $W^{th}$ resource configuration; the first resource configuration is any one of the W resource configurations; and W≥2, and W is an integer; and determining reference signals having a mapping relationship as one of the N reference signal groups.

The reference signals having the mapping relationship may be reference signals having a QCL relationship, or reference signals having a same QCL relationship.

The terminal receives the configuration information flexibly configured by the network device, thereby improving flexibility of configuring the reference signal group by the network device.

According to a second aspect, a channel state information transmission method is provided. The method includes:

sending N reference signal groups, where each of the N reference signal groups includes at least two reference signals, the at least two reference signals are reference signals that are simultaneously received, N≥1, and N is an integer; and receiving indication information, where the indication information indicates channel state information of at least one reference signal in each of K reference signal groups, the K reference signal groups are at least one of the N reference signal groups, 1≤K≤N, and K is an integer.

A network device sends the N reference signal groups, where each of the N reference signal groups includes M reference signals that are simultaneously received; and receives the indication information used to indicate the channel state information of the at least one reference signal in each of the K reference signal groups. Therefore, the network device can receive, in a scenario in which a plurality of reference signals can be simultaneously received, the channel state information that is of the reference signal and that is sent by a terminal, and selects a beam from a plurality of beams that can be simultaneously sent to send data. In this way, when a quantity of selected beams is greater than 1, communication efficiency is improved; when a beam with high communication quality is selected from the plurality of beams, communication quality can be improved; and when the channel state information of the at least one reference signal is fed back, if a quantity of the at least one reference signal is less than a total quantity of corresponding reference signal groups, signaling overheads can be reduced.

In some embodiments, the channel state information of the at least one reference signal in a $i^{th}$ reference signal group in the K reference signal groups is channel state information of Li reference signals, 1≤i≤K, 1≤Li≤M, i, Li, and M are all integers, M is a quantity of all reference signals included in a $i^{th}$ reference signal group, and the channel state information of the Li reference signals includes at least one of the following content:

X reference signal resource indexes, Y pieces of reference signal received quality RSRQ, or a quantity of reference signals, where X≤Li, and Y≤Li.

In some embodiments, the channel state information of the at least one reference signal in a $i^{th}$ reference signal group in the K reference signal groups is channel state information of Li reference signals, 1≤i≤K, 1≤Li≤M, i, Li, and M are all integers, M is a quantity of all reference signals included in a $i^{th}$ reference signal group, and the channel state information of the Li reference signals includes at least one of the following content:

X reference signal resource indexes, Z signal to interference plus noise ratios SINRs, or a quantity of reference signals, where X≤Li, and Z≤Li.

In some embodiments, the X reference signal resource indexes and/or the Y pieces of RSRQ in the indication information and the quantity of reference signals that is in the indication information are separately encoded.

In some embodiments, the X reference signal resource indexes and/or the Z SINRs in the indication information and the quantity of reference signals that is in the indication information are separately encoded.

In some embodiments, X<Li when the Li reference signals have a mapping relationship.

In some embodiments, the method further includes:

sending configuration information, where the configuration information indicates W resource sets used for channel measurement, each of the W resource sets includes a plurality of reference signals, and reference signals in a first resource set in the W resource sets are one-to-one mapped to reference signals in each of resource sets other than the first resource set in the W resource set; the first resource set is any one of the W resource sets; and W≥2, and W is an integer.

In some embodiments, the method further includes:

sending configuration information, where the configuration information indicates W resource configurations used for channel measurement, each of the W resource configurations includes a plurality of reference signal resources, and reference signal resources in a first resource configuration in the W resource configurations are one-to-one mapped to reference signal resources in each of resource configurations other than the first resource configuration in the $W^{th}$ resource configuration; the first resource configuration is any one of the W resource configurations; and W≥2, and W is an integer.

According to a third aspect, a channel state information transmission apparatus is provided. The apparatus may be a terminal, or may be a chip in a terminal. The apparatus has functions of implementing the embodiments of the first aspect. The functions may be implemented by hardware, or may be implemented by hardware executing corresponding software. The hardware or the software includes one or more units corresponding to the foregoing functions.

In an embodiment, when the apparatus is the terminal, the terminal includes a processing module and a transceiver module. The processing module may be, for example, a processor. The transceiver module may be, for example, a transceiver, and the transceiver includes a radio frequency circuit. Optionally, the terminal further includes a storage module, and the storage module may be, for example, a memory. The storage module may alternatively be a storage module that is in the terminal and that is located outside the chip, for example, a read-only memory (ROM), another type of static storage device that can store static information and an instruction, or a random access memory (RAM). When the terminal includes the storage module, the storage module is configured to store a computer executable instruction, the processing module is connected to the storage module, and the processing module executes the computer executable instruction stored in the storage module, so that the terminal performs the method according to any one of the first aspect or the implementations of the first aspect.

In another embodiment, when the apparatus is the chip in the terminal, the chip includes a processing module and a transceiver module. The processing module may be, for example, a processor, and the transceiver module may be, for example, an input/output interface, a pin, or a circuit on the chip. The processing module can execute a computer executable instruction stored in a storage module, so that the chip in the terminal performs the method according to any one of the first aspect or the implementations of the first aspect. Optionally, the chip may further include the storage module. The storage module is a storage module in the chip, for example, a register or a cache.

The processor mentioned above may be a general-purpose central processing unit (CPU), a microprocessor, an application-specific integrated circuit (ASIC), or one or more integrated circuits configured to control program execution of the method in the first aspect.

According to a fourth aspect, a channel state information transmission apparatus is provided. The apparatus may be a network device, or may be a chip in a network device. The apparatus has functions of implementing the embodiments of the second aspect or a ninth aspect. The functions may be implemented by hardware, or may be implemented by hardware executing corresponding software. The hardware or the software includes one or more units corresponding to the foregoing functions.

In an embodiment, when the apparatus is the network device, the network device includes a processing module and a transceiver module. The processing module may be, for example, a processor. The transceiver module may be, for example, a transceiver, and the transceiver includes a radio frequency circuit. Optionally, the network device further includes a storage module, and the storage module may be, for example, a memory. The storage module may alternatively be a storage module that is in the network device and that is located outside the chip, for example, a read-only memory (ROM), another type of static storage device that can store static information and an instruction, or a random access memory (RAM). When the network device includes the storage module, the storage module is configured to store a computer executable instruction, the processing module is connected to the storage module, and the processing module executes the computer executable instruction stored in the storage module, so that the network device performs the method according to any one of the second aspect or the implementations of the second aspect or any one of the ninth aspect or the implementations of the ninth aspect.

In another embodiment, when the apparatus is the chip in the network device, the chip includes a processing module and a transceiver module. The processing module may be, for example, a processor, and the transceiver module may be, for example, an input/output interface, a pin, or a circuit on the chip. The processing module can execute a computer executable instruction stored in a storage module, so that the chip in the network device performs the method according to any one of the second aspect or the implementations of the second aspect or any one of the ninth aspect or the implementations of the ninth aspect. Optionally, the chip may further include the storage module. The storage module is a storage module in the chip, for example, a register or a cache.

The processor mentioned above may be a general-purpose central processing unit (CPU), a microprocessor, an application-specific integrated circuit (ASIC), or one or more integrated circuits configured to control program execution of the method in the second aspect.

According to a fifth aspect, a communications system is provided. The communications system includes the apparatus according to the third aspect and the apparatus according to the fourth aspect.

According to a sixth aspect, a computer storage medium is provided. The computer storage medium stores program code, and the program code indicates an instruction for performing the method according to any one of the first aspect or the embodiments of the first aspect, the method according to any one of the second aspect or the embodiments of the second aspect, or a method according to any one of a ninth aspect or embodiments of the ninth aspect.

According to a seventh aspect, a processor is provided. The processor is configured to be coupled to a memory, and is configured to perform the method according to any one of the first aspect or the embodiments of the first aspect, the method according to any one of the second aspect or the embodiments of the second aspect, or a method according to any one of a ninth aspect or embodiments of the ninth aspect.

According to an eighth aspect, a computer program product including an instruction is provided. When the computer program product is run on a computer, the computer is enabled to perform the method according to any one of the first aspect or the embodiments of the first aspect, the method according to any one of the second aspect or the embodiments of the second aspect, or a method according to any one of a ninth aspect or embodiments of the ninth aspect.

Based on the foregoing technical solutions, the terminal receives the N reference signal groups, where each of the N reference signal groups includes M reference signals that are simultaneously received; and sends the indication information used to indicate the channel state information of the at least one reference signal in each of the K reference signal groups. Therefore, the terminal can feed back the channel state information of the reference signal in a scenario in which a plurality of reference signals can be simultaneously received, so that the network device selects a beam from a plurality of beams that can be simultaneously sent to send data. In this way, when a quantity of selected beams is greater than 1, communication efficiency is improved; when a beam with high communication quality is selected from the plurality of beams, communication quality can be improved; and when the channel state information of the at least one reference signal is fed back, if a quantity of the at least one reference signal is less than a total quantity of corresponding reference signal groups, signaling overheads can be reduced.

According to a ninth aspect, a channel state information transmission method is provided. The method may be performed by a terminal device, or may be performed by a chip configured in a terminal device. This is not limited in this application.

Specifically, the method includes: receiving P reference signals, where P is an integer greater than 1; and sending indication information, where the indication information indicates channel state information of at least one reference signal in each of K reference signal groups, reference signals in the K reference signal groups are reference signals in the P reference signals, and K is an integer; and when one of the K reference signal groups includes at least two reference signals, the reference signals in the one reference signal group are reference signals that are simultaneously received.

Based on the foregoing technical solution, the terminal device receives the P reference signals, selects K groups of reference signals from the P reference signals, and feeds back channel state information of the K groups of reference signals, where when one reference signal group in the K groups of reference signals includes at least two reference signals, the reference signals in the one reference signal group are reference signals that are simultaneously received, so that a network device selects a beam from a plurality of beams that can be simultaneously sent to send data. In this way, when a quantity of selected beams is greater than 1, communication efficiency is improved; and when a combination of beams with high communication quality is selected from the plurality of beams, communication quality can be improved.

In some embodiments, the channel state information of the at least one reference signal in a $i^{th}$ reference signal group in the K reference signal groups is channel state information of Li reference signals, $1 \le i \le K$, $1 \le Li \le M$, i, Li, and M are all integers, M is a quantity of all reference signals included in a $i^{th}$ reference signal group, and the channel state information of the Li reference signals includes at least one of the following content: X reference signal resource indexes, Z signal to interference plus noise ratios SINRs, or a quantity of reference signals, where $X \le Li$, and $Z \le Li$.

Based on the foregoing technical solution, when a quantity of reference signal resource indexes is less than a quantity of reference signals whose channel state information needs to be reported, or a quantity of SINRs of a reference signal is less than a quantity of reference signals whose channel state information needs to be reported, a quantity of bits occupied by the indication information can be reduced, thereby reducing signaling overheads.

In some embodiments, when Li is equal to 1, the method further includes: determining a first SINR of a first reference signal in a $i^{th}$ reference signal group based on first channel information and first interference information, where the first channel information is obtained by performing channel measurement on a reference signal resource on which the first reference signal is located; the first interference information is obtained by performing interference measurement on a reference signal resource on which the first reference signal or a second reference signal is located; and the second reference signal does not belong to a $i^{th}$ reference signal group.

It is determined, based on the first channel information S and the first interference information I, that the first SINR of the first reference signal may be: SINR=S/I.

In some embodiments, when Li is greater than 1, the method further includes: determining an SINR of the $j^{th}$ reference signal in the Li reference signals based on second channel information and second interference information, where the second channel information is obtained by performing channel measurement on a reference signal resource on which the $j^{th}$ reference signal is located; the second interference information is obtained by performing interference measurement on reference signal resources on which the Li reference signals are located; and the $j^{th}$ reference signal is any one of the Li reference signals, and j is an integer.

The $j^{th}$ reference signal is the any one of the Li reference signals. In this way, a corresponding SINR may be determined for each of the Li reference signals in a manner of determining the SINR of the $j^{th}$ reference signal.

In some embodiments, when Li is greater than 1, the method further includes: determining an SINR of the $j^{th}$ reference signal in the Li reference signals based on second channel information and second interference information, where the second channel information is obtained by performing channel measurement on a reference signal resource on which the $j^{th}$ reference signal is located; the second interference information is obtained by performing interference measurement on a reference signal resource on which a reference signal other than the $j^{th}$ reference signal in the Li reference signals is located; the second reference signal is different from the Li reference signals in a $i^{th}$ reference signal group; and the $j^{th}$ reference signal is any one of the Li reference signals, and j is an integer.

The $j^{th}$ reference signal is the any one of the Li reference signals. In this way, a corresponding SINR may be determined for each of the Li reference signals in a manner of determining the SINR of the $j^{th}$ reference signal. The interference information is obtained by measuring the reference signal resource on which the reference signal other than the $j^{th}$ reference signal in the Li reference signals is located, that is, mutual interference between the Li reference signals needs to be considered, to accurately determine communication quality of each reference signal, and further improve communication quality.

In some embodiments, when Li is greater than 1, the method further includes: determining an SINR of the $j^{th}$ reference signal in the Li reference signals based on second channel information and second interference information, where the second channel information is obtained by performing channel measurement on a reference signal resource on which the $j^{th}$ reference signal is located; the second interference information is obtained by performing interference measurement on reference signal resources on which a reference signal other than the $j^{th}$ reference signal in the Li reference signals and a second reference signal are located; the second reference signal is different from the Li reference signals in a $i^{th}$ reference signal group; and the $j^{th}$ reference signal is any one of the Li reference signals, and j is an integer.

During measurement of the interference information, mutual interference between the Li reference signals and impact of another cell on the terminal need to be considered, to more accurately determine communication quality of each reference signal, and further improve communication quality.

In some embodiments, when Li is greater than 1, the method further includes: determining the third SINR based on Li pieces of third channel information and third interference information, where each of the Li pieces of third channel information is obtained by performing channel measurement on a reference signal resource on which one of the Li reference signals is located; the third interference information is obtained by performing interference measurement on reference signal resources on which the Li reference signals and a second reference signal are located; and the second reference signal is different from the Li reference signals in a $i^{th}$ reference signal group.

The terminal may directly obtain the third SINR through measurement based on the Li pieces of third channel information and the third interference information, where the third SINR may be considered as an equivalent SINR of the Li reference signals.

In some embodiments, when Li is greater than 1, the method further includes: determining the third SINR based on Li pieces of third channel information and third interference information, where each of the Li pieces of third channel information is obtained by performing channel measurement on a reference signal resource on which one of the Li reference signals is located; the third interference information is obtained by performing interference measurement on reference signal resources on which the Li reference signals are located; and the second reference signal is different from the Li reference signals in a $i^{th}$ reference signal group.

In some embodiments, when Li is greater than 1, the method further includes: determining the fourth SINR based on fourth channel information and fourth interference information, where the fourth channel information is a maximum value in Li pieces of channel information that is obtained by performing channel measurement on a reference signal resource on which each of the Li reference signals is located; the fourth interference information is obtained by performing interference measurement on reference signal resources on which the Li reference signals and a second reference signal are located; and the second reference signal is different from the Li reference signals in a $i^{th}$ reference signal group.

The terminal may determine the fourth SINR based on the maximum channel information in the channel information of the Li reference signals and the fourth interference information, where the fourth SINR may be considered as an equivalent SINR of the Li reference signals.

In some embodiments, when Li is greater than 1, the method further includes: determining the fourth SINR based on fourth channel information and fourth interference information, where the fourth channel information is a maximum value in Li pieces of channel information that is obtained by performing channel measurement on a reference signal resource on which each of the Li reference signals is located; the fourth interference information is obtained by performing interference measurement on reference signal resources on which the Li reference signals are located; and the second reference signal is different from the Li reference signals in a $i^{th}$ reference signal group.

In some embodiments, a X reference signal resource indexes and/or a Z SINRs in the indication information and a quantity of reference signals in the indication information are separately encoded.

The indication information may include two parts. A first part is the quantity of reference signals, and a second part is the X reference signal resource indexes and/or the Z SINRs. When parsing the indication information, the network device may first parse the first part, and then parse the second part. In this way, the network device may determine, based on the quantity of reference signals that is first obtained through parsing, a size of a resource that needs to be used to parse the second part, to avoid a resource waste caused by uniformly parsing all the content of the indication information by using a fixed resource. To be specific, resource overheads of parsing the indication information by the network device can be reduced through separate encoding.

In some embodiments, X<Li when the Li reference signals have a mapping relationship.

The indication information may carry indexes less than those of the Li reference signals, thereby reducing signaling overheads.

DESCRIPTION OF EMBODIMENTS

The following describes technical solutions in this application with reference to the accompanying drawings.

The technical solutions in the embodiments of this application may be applied to various communications systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

A terminal in the embodiments of this application may be user equipment (UE), an access terminal, a subscriber unit, a subscriber station, a mobile station, a mobile console, a remote station, a remote terminal, a mobile device, a user terminal, a wireless communications device, a user agent, or a user apparatus. The terminal may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal in a future 5G network, or a terminal in a future evolved public land mobile network (PLMN). This is not limited in the embodiments of this application.

A network device in the embodiments of this application may be a device configured to communicate with the terminal. The network device may be a base transceiver station (BTS) in a global system for mobile communications (GSM) or a code division multiple access (CDMA) system, or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay node, an access point, a vehicle-mounted device, a wearable device, a network device in a future 5G network, a network device in a future evolved PLMN, or the like. This is not limited in the embodiments of this application.

Figure 1:
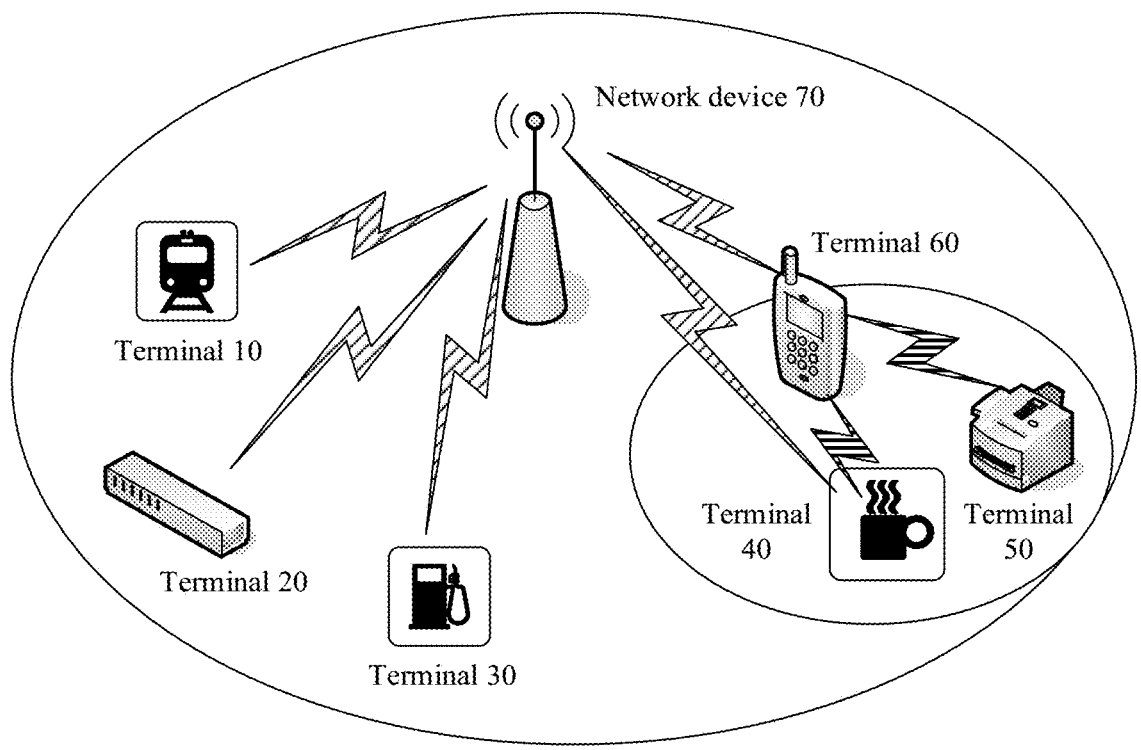
FIG. 1 is a schematic diagram of a communications system according to this application.

FIG. 1 is a schematic diagram of a communications system according to this application. The communications system in FIG. 1 may include at least one terminal (for example, a terminal 10, a terminal 20, a terminal 30, a terminal 40, a terminal 50, and a terminal 60) and a network device 70. The network device 70 is configured to: provide a communications service for the terminal and access a core network. The terminal may access a network by searching for a synchronization signal, a broadcast signal, or the like sent by the network device 70, to communicate with the network. The terminal 10, the terminal 20, the terminal 30, the terminal 40, and the terminal 60 in FIG. 1 may perform uplink and downlink transmission with the network device 70. For example, the network device 70 may send downlink signals to the terminal 10, the terminal 20, the terminal 30, the terminal 40, and the terminal 60, or may receive uplink signals sent by the terminal 10, the terminal 20, the terminal 30, the terminal 40, and the terminal 60.

In addition, the terminal 40, the terminal 50, and the terminal 60 may also be considered as a communications system. The terminal 60 may send downlink signals to the terminal 40 and the terminal 50, or may receive uplink signals sent by the terminal 40 and the terminal 50.

It should be noted that this embodiment of this application may also be applied to a communications system including at least two TRPs (for example, a TRP 1 and a TRP 2) and at least one terminal (for example, UE). The TRP 1 and the TRP 2 may simultaneously send a reference signal or data to the UE. The UE may also perform uplink transmission with the TRP 1 and the TRP 2.

To facilitate understanding of this application, the following describes terms related to this application.

Beam:

The beam is a communication resource, and different beams may be considered as different communication resources. Different beams may be used to send same information, or may be used to send different information. The beam may correspond to at least one of a time domain resource, a space resource, and a frequency domain resource.

Optionally, a plurality of beams having a same or a same type of communication feature may be considered as one beam, and one beam may include one or more antenna ports, configured to transmit a data channel, a control channel, a sounding signal, and the like. For example, a transmit beam may refer to signal strength distribution formed in different directions in space after a signal is transmitted through an antenna, and a receive beam may refer to signal strength distribution in different directions in space of a radio signal received from an antenna.

For example, the beam may be a wide beam, may be a narrow beam, or may be a beam of another type. A beam forming technology may be a beamforming technology or another technical means. This is not limited in this application. Through the beamforming technology, a higher antenna array gain may be implemented by sending or receiving a signal in a specific direction in space. In addition, beams may be classified into a transmit beam and a receive beam of the network device, and a transmit beam and a receive beam of the terminal. The transmit beam of the network device is used to describe beamforming information on a transmit side of the network device, and the receive beam of the network device is used to describe beamforming information on a receive side of the network device. The transmit beam of the terminal is used to describe beamforming information on a transmit side of the terminal, and the receive beam of the terminal is used to describe beamforming information on a receive side.

More specifically, the beamforming technology includes a digital beamforming technology, an analog beamforming technology, and a hybrid digital analog beamforming technology. The analog beamforming technology may be implemented by using a radio frequency. For example, a phase of a radio frequency chain (RF chain) is adjusted by using a phase shifter, to control a change of an analog beam direction. Therefore, one RF chain can generate only one analog beam at a same moment. In addition, for communication based on the analog beam, a beam at a transmit end and a beam at a receive end need to be aligned. Otherwise, a signal cannot be normally transmitted.

It should be understood that one or more antenna ports forming one beam may also be considered as one antenna port set.

Figure 2:
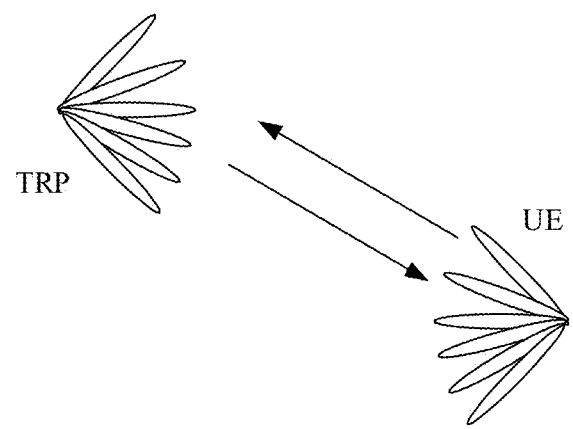
FIG. 2 is a schematic diagram of beam training.

It should be further understood that the beam may be further represented by using a spatial filter or a spatial domain transmission filter. In other words, the beam may also be referred to as the "spatial filter". A transmit beam is referred to as a "spatial transmit filter", and a receive beam is referred to as a "spatial receive filter" or a "downlink spatial filter". The receive beam of the network device or the transmit beam of the terminal device may also be referred to as an "uplink spatial filter", and the transmit beam of the network device or the receive beam of the terminal device may also be referred to as a "downlink spatial filter". FIG. 2 is a schematic diagram of beam training. N optimal beam pairs links (BPLs) (one BPL includes one transmit beam of a network device and one receive beam of a terminal, or one BPL includes one transmit beam of a terminal and one receive beam of a network device) are selected. The terminal selects the transmit beam of the network device and/or the receive beam of the terminal based on beam sweeping performed by the network device, and the network device selects the transmit beam of the terminal and/or the receive beam of the network device based on beam sweeping performed by the terminal.

The transmit beam may be a base station transmit beam or a terminal transmit beam. When the transmit beam is the base station transmit beam, a base station sends reference signals to UE through different transmit beams; and the UE receives, through a same receive beam, the reference signals sent by the base station through the different transmit beams, determines an optimal base station transmit beam based on the received signals, and then feeds back the optimal base station transmit beam to the base station, so that the base station updates the transmit beam. When the transmit beam is the terminal transmit beam, UE sends reference signals to a base station through different transmit beams; and the base station receives, through a same receive beam, the reference signals sent by the UE through the different transmit beams, determines an optimal UE transmit beam based on the received signals, and then feeds back the optimal UE transmit beam to the UE, so that the UE updates the transmit beam. The process of sending the reference signals through the different transmit beams may be referred to as beam sweeping, and the process of determining the optimal transmit beam based on the received signals may be referred to as beam matching.

The receive beam may be a base station receive beam or a terminal receive beam. When the receive beam is the base station receive beam, the UE sends reference signals to the base station through a same transmit beam; and the base station receives, through different receive beams, the reference signals sent by the UE, and then determines an optimal base station receive beam based on the received signals, to update the base station receive beam. When the receive beam is the UE receive beam, the base station sends reference signals to the UE through a same transmit beam; and the UE receives, through different receive beams, the reference signals sent by the base station, and then determines an optimal UE receive beam based on the received signals, to update the UE receive beam.

It should be noted that for downlink beam training, the network device configures a type of a reference signal resource set for beam training. When a repetition parameter configured for the reference signal resource set is "on", the terminal device assumes that reference signals in the reference signal resource set are transmitted by using a same downlink spatial filter, in other words, are transmitted by using a same transmit beam. In this case, usually, the terminal device receives the reference signals in the reference signal resource set by using different receive beams, and obtains a best receive beam of the terminal device through training. Optionally, the terminal device may report channel quality of N best reference signals measured by the UE. When a repetition parameter configured for the reference signal resource set is "off", the terminal device does not assume that reference signals in the reference signal resource set are transmitted by using a same downlink spatial filter, in other words, does not assume that the network device transmits the reference signals by using a same transmit beam. In this case, the terminal device selects N best beams from the resource set by measuring channel quality of the reference signals in the set, and feeds back the N best beams to the network device. Usually, in this case, the terminal device uses a same receive beam in this process.

In a conventional solution, in a beam training process, the terminal measures communication quality of a plurality of beams configured by the network device, and reports information about a beam with relatively high communication quality to the network device. The network device may also configure a maximum quantity of beams reported by the terminal, and the terminal may report information about a beam whose quantity is less than or equal to the maximum quantity of beams. In this way, the network device may receive and send data by using the beam reported by the terminal. However, communication efficiency is relatively low in the conventional solution.

Figure 3:
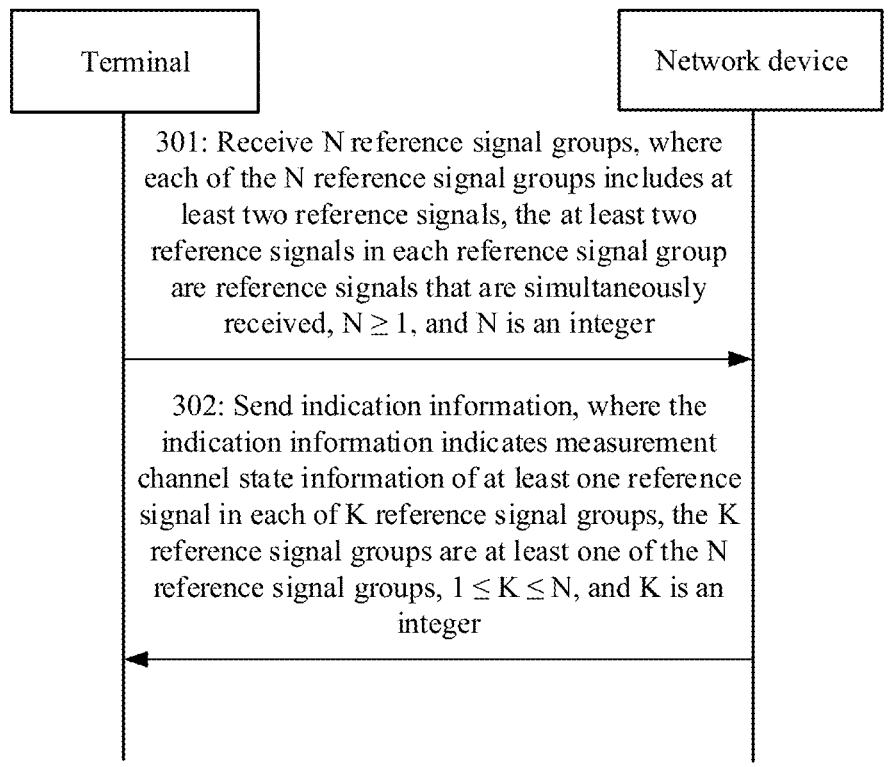
FIG. 3 is a schematic flowchart of a channel state information transmission method according to an embodiment of this application.

FIG. 3 is a schematic flowchart of a channel state information transmission method according to an embodiment of this application.

301: A terminal receives N reference signal groups, where each of the N reference signal groups includes at least two reference signals, the at least two reference signals in each reference signal group are reference signals that are simultaneously received, N≥1, and N is an integer. Correspondingly, a network device sends the N reference signal groups.

Specifically, transmit beams of different reference signals in this embodiment of this application are different. The terminal receives the N reference signal groups, where N>1 or N=1, and each reference signal group includes the at least two reference signals that can be simultaneously received by the terminal. All reference signal groups may include a same quantity of reference signals, or may include different quantities of reference signals. This is not limited in this application. The following embodiment may be described by using an example in which all the reference signal groups include the same quantity of reference signals. However, this application is not limited thereto. For example, each reference signal group includes M reference signals, where M>1, and M is an integer.

It should be noted that the M reference signals in each of the N reference signal groups may be from a same transmission reception point (TRP), or may be from different TRPs, or may be partially from a same TRP. This is not limited in this application.

It should be further noted that the reference signals that can be simultaneously received by the terminal may be simultaneously sent by the network device, or may not be simultaneously sent by the network device. For example, distances between the different TRPs and the terminal are different. In this case, moments at which reference signals sent from the different TRPs at different moments arrive at the terminal may be the same. In other words, the terminal can simultaneously receive the reference signals sent at the different moments.

It should be understood that in this embodiment of this application, simultaneity refers to receiving at a same moment, or receiving at an overlapping moment, or receiving in a same time unit, or receiving in least one overlapping time unit, and the M reference signals overlap in at least one time unit. The time unit may be one or more radio frames, one or more subframes, one or more slots, one or more mini slots (mini slot), or one or more orthogonal frequency division multiplexing (OFDM) symbols defined in an LTE system or a 5G NR system, or may be a time window including a plurality of frames or subframes, for example, a system information (SI) window. The following embodiment is described by using an example in which the reference signals that are simultaneously received are reference signals received on one or more OFDM symbols. This is not limited in this application.

It should be understood that in this embodiment of this application, the terminal device reports channel state information of the reference signals that are simultaneously received. It may be understood as that the terminal device reports the channel state information of the reference signals when a parameter (group Based Beam Reporting) configured by the network device for the terminal device is in an "enabled" state. Usually, the network device indicates a reporting type of the terminal device in reporting configuration information sent to the terminal device. Only when a parameter group based beam reporting in the reporting configuration information is in an "enabled" state, the terminal device reports channel state information of reference signals that can be simultaneously received by the terminal device. When a parameter group based beam reporting in the reporting configuration information is not in an "enabled" state, a plurality of reference signals reported by the terminal device at one moment are not limited (the plurality of reference signals may be simultaneously received, or may not be simultaneously received).

Optionally, before receiving the N reference signal groups, the terminal may further receive configuration information sent by the network device. The configuration information indicates the N reference signal groups and the reference signals included in each of the N reference signal groups.

For example, the network device may directly indicate, by using the configuration information, the N reference signal groups and the reference signals included in each of the N reference signal groups, or may indirectly indicate, in another manner, the N reference signal groups and the reference signals included in each of the N reference signal groups. This is not limited in this application.

It should be noted that the configuration information may be at least one of a radio resource control (RRC) signaling, a media access control (MAC) control element (CE), or downlink control information (DCI) signaling.

Optionally, that the configuration information indirectly indicates the N reference signal groups and the reference signals included in each of the N reference signal groups may be specifically: The configuration information indicates W resource sets used for channel measurement, each of the W resource sets includes a plurality of reference signals, and there is a mapping relationship between reference signals in a first resource set in the W resource sets and reference signals in each of resource sets other than the first resource set in the W resource set; and W≥2, and W is an integer. The terminal may determine reference signals having a mapping relationship as one of the N reference signal groups.

For example, the network device sends the configuration information. The configuration information indicates the W resource sets used for channel measurement, and each resource set includes the plurality of reference signals. Different resource sets may include a same quantity of reference signals, or may include different quantities of reference signals. There is a mapping relationship between reference signals included in any resource set (for example, the first resource set) in the W resource sets and reference signals in at least one of resource sets other than the first resource set.

It should be understood that this embodiment of this application may be applied to a scenario in which the M simultaneously received reference signals in the N reference signal groups are reference signals that are simultaneously sent by the network device.

Optionally, if the different resource sets include the same quantity of reference signals, the reference signals included in the first resource set may be one-to-one mapped to the reference signals in each of the resource sets other than the first resource set, and the reference signals having the mapping relationship may be determined as one of the N reference signal groups.

Optionally, time-frequency resource locations of the W resource sets are of frequency division multiplexing (FDM).

Still further, time-frequency resources of the reference signals that meet the one-to-one mapping relationship are of FDM. In other words, the reference signals that meet the one-to-one mapping relationship are reference signals that whose time-frequency resources are of FDM.

Figure 4:
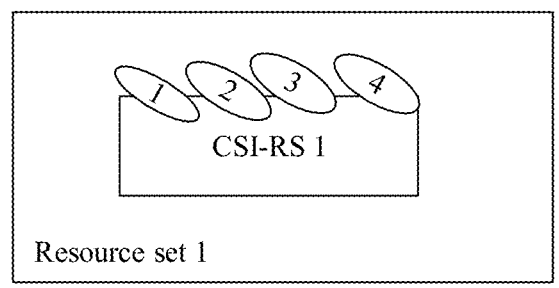
FIG. 4 is a schematic diagram of a resource set configured by using configuration information.
Figure 4:
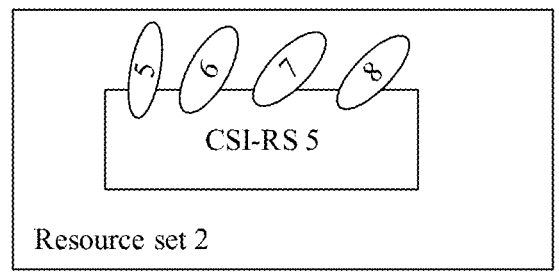

For example, as shown in FIG. 4, the configuration information includes two resource sets: a resource set 1 and a resource set 2. The resource set 1 includes four reference signals (which are respectively a reference signal 1, a reference signal 2, a reference signal 3, and a reference signal 4), the resource set 2 also includes four reference signals (which are respectively a reference signal 5, a reference signal 6, a reference signal 7, and a reference signal 8), and the four reference signals in the resource set 1 are one-to-one mapped to the four reference signals in the resource set 2. For example, there is a mapping relationship between the reference signal 1 and the reference signal 5, a mapping relationship between the reference signal 2 and the reference signal 6, a mapping relationship between the reference signal 3 and the reference signal 7, and a mapping relationship between the reference signal 4 and the reference signal 8. In this way, the reference signal 1 and the reference signal 5 may be a resource combination, the reference signal 2 and the reference signal 6 may be a resource combination, the reference signal 3 and the reference signal 7 may be a resource combination, and the reference signal 4 and the reference signal 8 may be a resource combination.

Optionally, the configuration information may alternatively be used to indicate W resource configurations used for channel measurement, and each resource configuration includes a plurality of reference signals. Different resource configurations may include a same quantity of reference signals, or may include different quantities of reference signals. There is a mapping relationship between reference signals included in any resource configuration (for example, a first resource configuration) in the W resource configurations and reference signals in at least one of resource configurations other than the first resource configuration.

For example, the resource configuration includes a group of reference signal resource sets and a resource type (for example, a time domain type, where the time domain type includes a periodic time domain type, an aperiodic time domain type, and a semi-periodic time domain type). In this case, the resource configuration information may be RRC signaling. Optionally, one or more resource sets are indicated by sending a MAC CE and/or DCI signaling to the UE.

It should be understood that this embodiment of this application may be applied to a scenario in which the M simultaneously received reference signals in the N reference signal groups are reference signals that are simultaneously sent by the network device.

302: The terminal sends indication information, where the indication information indicates channel state information of at least one reference signal in each of K reference signal groups, the K reference signal groups are at least one of the N reference signal groups, 1≤K≤N, and K is an integer. Correspondingly, the network device receives the indication information.

For example, the terminal receives the N reference signal groups sent by the network device, where each reference signal group includes a plurality of reference signals that can be simultaneously received; and the terminal feeds back, to the network device, the indication information indicating the channel state information of the at least one reference signal, where the at least one reference signal may belong to the K reference signal groups in the N reference signal groups. To be specific, the terminal can feed back the channel state information of the reference signal in a scenario in which the plurality of reference signals can be simultaneously received, so that the network device can select a beam from a plurality of beams that can be simultaneously sent to send data. In this way, when a quantity of selected beams is greater than 1, communication efficiency is improved; when a beam with high communication quality is selected from the plurality of beams, communication quality can be improved; and when the channel state information of the at least one reference signal is fed back, if a quantity of the at least one reference signal is less than a total quantity of corresponding reference signal groups, signaling overheads can be reduced.

It should be noted that the quantity of the at least one reference signal in each reference signal group needs to be carried in the indication information.

It should be further noted that different reference signal groups in the K reference signal groups include different quantities of the at least one reference signal. In addition, the quantity of the at least one reference signal and an amount of channel state information of the at least one reference signal may be the same or may be different. For example, there may be three pieces of channel state information of three reference signals, or may be another amount of channel state information of three reference signals. This is not limited in this application.

It should be understood that the K reference signal groups may also be considered as subsets in the N reference signal groups.

Optionally, the terminal may determine the K reference signal groups and/or the at least one reference signal in each of the K reference signal groups based on channel quality of reference signals in the N reference signal groups and/or a transmission mode.

Optionally, the terminal may determine, based on the channel quality of the reference signals in the N reference signal groups, reference signals whose channel state information is carried in the indication information. For example, the terminal may determine reference signal groups and reference signals in a reference signal group.

Optionally, the terminal may determine the K reference signal groups and/or the at least one reference signal in each of the K reference signal groups based on channel quality of at least one subset in each of at least one reference signal group in the N reference signal groups.

For example, one reference signal group (for example, a first reference signal group) includes a plurality of reference signals, and any at least one of the plurality of reference signals is combined into a subset in the first reference signal group. The terminal may select one target subset in each reference signal group based on channel quality of all subsets in each of the N reference signal groups, then select the K reference signal groups from the N reference signal groups based on channel quality of the target subset in each reference signal group, and send, to the network device by using the indication information, channel state information of reference signals included in target subsets in the K reference signal groups. In this way, the network device may simultaneously send data based on beams corresponding to the reference signals in the target subsets. In other words, the terminal recommends, to the network device, the transmission mode in which the network device sends the data, to improve communication quality.

It should be noted that some subsets in the one reference signal group (for example, the first reference signal group) may not be involved in the foregoing selection process. In this way, the terminal may select a target subset based on the some subsets in the first reference signal group. This is not limited in this application. Similarly, some of the N reference signal groups may not be involved in the foregoing selection process. In this way, the terminal may select the K reference signal groups based on some of the N reference signal groups.

It should be understood that channel quality of one subset is equivalent channel quality of all reference signals included in the subset. To be specific, it is assumed that the network device simultaneously sends only the equivalent channel quality obtained by measuring the reference signals in the subset.

Optionally, the channel quality in this embodiment of this application may be reference signal received quality (RSRQ), or may be a signal to interference plus noise ratio (SINR).

Optionally, the terminal may determine the K reference signal groups and/or the at least one reference signal in each of the K reference signal groups based on channel quality of at least one subset in each of at least one reference signal group in the N reference signal groups and a transmission mode.

For example, the transmission mode may indicate a quantity of transmit beams used by the network device to simultaneously send signals. In other words, different transmission modes indicate different quantities of transmit beams used by the network device to simultaneously send signals. In other words, the transmission mode indicates a quantity of base stations (a quantity of TRPs) that are simultaneously served. For example, the transmission mode includes an indication of a quantity of beams, or an indication of a quantity of reference signals, or a quantity of TRPs that are simultaneously served, or only data transmission (DPS) or non-coherent joint transmission (Incoherent joint transmission, NCJT) transmission. The terminal may determine a target subset with reference to the transmission mode. To be specific, a quantity included in a target subset selected by the terminal can only be a quantity of transmit beams that is indicated by the transmission mode. In this case, the terminal needs to select the target subset only based on channel quality of a subset that is in each reference signal group and that includes the quantity of transmit beams that is indicated by the transmission mode.

It should be understood that the transmission mode may be indicated by using dynamic signaling or semi-static signaling. In this case, the network device may indicate different transmission modes at different moments. If information about a reference signal is indicated by using signaling that is longer or slower than the signaling, at a moment, the UE needs to select, based on indication information of the transmission mode, several reference signals from a plurality of reference signals that are simultaneously transmitted, and report the selected reference signals to the network device; and at another moment, the UE does not need to make a selection from the reference signals that are simultaneously transmitted.

It should be understood that the transmission mode may be preconfigured by the network device for the terminal, or may be agreed on by the network device and a terminal in advance. This is not limited in this application.

Optionally, the terminal may alternatively determine the K reference signal groups and/or the at least one reference signal in each of the K reference signal groups only based on a transmission mode.

For example, if a quantity of transmit beams that is indicated by the transmission mode is a quantity of all reference signals included in the reference signal group, and K=M, the terminal can select only all the reference signals in the reference signal group as the at least one reference signal.

Optionally, the at least one reference signal in a $i^{th}$ reference signal group in the K reference signal groups is Li reference signals, in other words, the target subset selected by the terminal includes the Li reference signals, where $1 \leq i \leq K$, $1 \leq Li \leq M$, and both i and Li are integers. In this case, channel state information of the Li reference signals may include at least one of the following content: X reference signal resource indexes, Y pieces of reference signal received quality RSRQ, or a quantity of reference signals, where $X \leq Li$, and $Y \leq Li$.

For example, the reference signal resource index indicates a time domain resource and/or a frequency domain resource and/or a space domain resource of a reference signal, for example, a CSI-RS resource indicator (CRI), or the CSI-RS resource index indicates a time domain resource and/or a frequency domain resource and/or a space domain resource of a CSI-RS. The quantity of reference signals is a quantity of reference signals included in the target subset in a $i^{th}$ reference signal group. The channel state information of the reference signal may include at least one of a resource index, RSRQ, and a quantity of reference signals. In other words, the channel state information of the reference signal may include any one of the resource index, a combination of the resource index and the RSRQ, the RSRQ, a combination of the RSRQ and the quantity of reference signals, a combination of the resource index and the quantity of reference signals, and a combination of the resource index, the RSRQ, and the quantity of reference signals. For example, the channel state information of the Li reference signals may include resource indexes respectively corresponding to the Li reference signals, RSRQ of each of the Li reference signals, and a quantity (namely, Li) of reference signals. Optionally, a quantity X of resource indexes included in the channel state information of the Li reference signals may be less than Li, and an amount Y of RSRQ of the Li reference signals may also be less than Li.

It should be noted that in a specific implementation process, the indication information includes any one of the foregoing content. The network device and the terminal may agree in advance on the content included in the indication information, so that the network device can correctly parse the indication information.

It should be noted that a value of i may be: $1 \le i \le K$. To be specific, a quantity of the at least one reference signal in the $1^{st}$ reference signal group in the K reference signal groups is L1, a quantity of the at least one reference signal in the 2nd reference signal group in the K reference signal groups is L2, and by analogy. In addition, the at least two reference signals in different reference signal groups may be different, in other words, values of L1 and L2 are different.

It should be further noted that the reference signal resource indexes may be independently and uniformly encoded for each reference signal in a reference signal set in which the reference signal is located. For example, in the W resource sets, reference signal resources in a first resource set are numbered 1 to 4 and reference signal resources in a second resource set are numbered 1 to 4, provided that an index or an identifier of the resource set and an index of a reference signal in the set are reported. Alternatively, reference signal resources in a first resource set and reference signal resources in a second resource set are uniformly numbered 1 to 8, or may be numbered in a group.

It should be understood that the "reference signal resource index" may also be referred to as a "reference signal resource indicator".

It should be further understood that when K 2, the quantity of reference signals that is in the indication information may be a quantity of reference signals in a target subset included in each of the K reference signal groups, or may be a sum of quantities of reference signals in target subsets included in each of the K reference signal groups.

Optionally, X<Li when there is a mapping relationship between the Li reference signals in a $i^{th}$ reference signal group. More specifically, a value of X may be set to 1 if another resource index in Li can be learned of based on one resource index in Li.

In this way, after receiving one reference signal resource index, the network device may find, by using the mapping relationship, other reference signals that are simultaneously transmitted. Therefore, reference signals corresponding to subsequent channel quality are known.

Optionally, Y<Li when RSRQ of the Li reference signals may be represented by using Y pieces of equivalent RSRQ. More specifically, Y=1 if the RSRQ of the Li reference signals is represented by using one piece of equivalent RSRQ.

It should be noted that when the indication information sent by the terminal is represented by using equivalent RSRQ, the indication information may further include reference signal received powers (RSRPs) of the Li reference signals, so that the network device can further obtain RSRQ of each of the Li reference signals based on the equivalent RSRQ and the RSRPs of the Li reference signals.

Optionally, if configuration information indicates W resource sets, a repetition (replication) parameter of at least one of the W resource sets is "off", and a repetition parameter of at least one of the resource sets is "on", the terminal device selects indication information of at least one reference signal in the K reference signal groups from the resource set, and reports the indication information to the base station. In this case, the indication information includes at least a reference signal resource index.

It should be understood that this embodiment of this application may be applied to a scenario in which the M simultaneously received reference signals in the N reference signal groups are reference signals that are simultaneously sent by the network device.

Optionally, in the foregoing resource configuration mode, the terminal device assumes that spatial domain transmit filters of the network device are different or receive filters of the terminal device are the same.

Optionally, in the foregoing resource configuration mode, there is a one-to-one mapping relationship between resources in the W resource sets. In this case, the W resource sets may be used for transmit beam training on a base station side in multi-beam transmission. The multi-beam transmission indicates a plurality of beams or signals that are simultaneously transmitted.

It should be understood that there is a one-to-one mapping relationship only when reference signal resource sets in the W resource sets meet a frequency division multiplexing FDM relationship.

Optionally, when the terminal device reports information about at least one reference signal in the K reference signal groups, that is, Li=W, and the terminal device reports indication information of each reference signal group, the terminal device may report only an index of a reference signal whose reference signal resource set is an "off" type. In a conventional solution, a transmit beam on a base station side can be trained only by using a resource set of an "off" type, but a plurality of beams that can be simultaneously transmitted cannot be trained to guide transmission modes of subsequent data or signals and simultaneous transmission of the subsequent data or signals. Therefore, in this embodiment of this application, system coverage or a spatial multiplexing gain of a system can be improved by using beams that are simultaneously transmitted, to further improve system performance. Therefore, the beams that are simultaneously transmitted are crucial to the entire system.

It should be understood that if the W resource sets are not all of FDM, or at least two resources are completely of TDM, indexes of the resource sets may further need to be reported.

For example, when W is equal to 2, the configuration information is used to configure a reference signal resource set whose repetition parameter is "off" and a reference signal resource set whose repetition parameter is "on". The set may be used to train a base station transmit beam.

Optionally, if the configuration information indicates two resource sets, and each of the reference signal groups includes signals of two types, namely, signals of "on and off" types, when the K reference signal groups are a plurality of reference signal groups, a group identifier of a reference signal of an "on" type, a group identifier of a reference signal of an "off" type, a resource index of the reference signal of the "off" type, and equivalent RSRQ or an equivalent SINR are reported.

It should be understood that reference signals of "on" types have a same transmit beam. Therefore, group identifiers of the reference signals of the "on" types may be used to represent a plurality of reference signals that have a same transmit beam.

Optionally, if configuration information indicates W resource sets, and all repetition parameters of resource sets in the W resource sets are "on", the terminal device selects indication information of at least one reference signal in the K reference signal groups from the resource set, and reports the indication information to the base station or does not report the indication information.

It should be understood that optionally, the reference signal state information does not include a reference signal resource index, but includes channel quality information.

It should be understood that optionally, in the foregoing resource configuration mode, there is a one-to-one mapping relationship between resources in the W resource sets. In this case, the W resource sets may be used for receive beam training on a terminal side in multi-beam transmission. The multi-beam transmission indicates a plurality of beams or signals that are simultaneously transmitted.

It should be understood that there is a one-to-one mapping relationship only when reference signal resource sets in the W resource sets meet a frequency division multiplexing FDM relationship.

It should be understood that if the W resource sets are not all of FDM, or at least two resources are completely of TDM, indexes of the resource sets may further need to be reported.

Optionally, the at least one reference signal in a $i^{th}$ reference signal group in the K reference signal groups is Li reference signals, $1 \le i \le K$, $1 \le Li \le M$, both i and Li are integers, and channel state information of the Li reference signals includes at least one of the following content: X reference signal resource indexes, Z signal to interference plus noise ratios SINRs, or a quantity of reference signals, where $X \le Li$, and $Z \le Li$.

For example, channel quality may be represented by using RSRQ, or may be represented by using a signal to interference plus noise ratio (signal to interference plus noise ratio, SINR). In this embodiment of this application, the Y pieces of RSRQ in the foregoing embodiment may be replaced with the Z SINRs for implementation. To avoid repetition, details are not described herein. A value of Y may be the same as or different from a value of Z. This is not limited in this application.

Optionally, the X reference signal resource indexes and/or the Y pieces of RSRQ in the indication information and the quantity of reference signals that is in the indication information may be separately encoded; or the X reference signal resource indexes and/or the Z SINRs in the indication information and the quantity of reference signals that is in the indication information may be separately encoded.

For example, the indication information may include two parts. A first part is the quantity of reference signals, and a second part is the X reference signal resource indexes and/or the Y pieces of RSRQ; or a second part is the X reference signal resource indexes and/or the Z SINRs. When parsing the indication information, the network device may first parse the first part, and then parse the second part. In this way, the network device may determine, based on the quantity of reference signals that is first obtained through parsing, a size of a resource that needs to be used to parse the second part, to avoid a resource waste caused by uniformly parsing all the content of the indication information by using a fixed resource. To be specific, resource overheads of parsing the indication information by the network device can be reduced through separate encoding.

For example, the quantity of reference signals is represented by Q1 bits, the X reference signal resource indexes and/or the Y pieces of RSRQ are represented by Q2 bits. The terminal device codes the Q1 bits to obtain first information, and codes the Q2 bits to obtain second information. In this case, the indication information includes the first information and the second information. Correspondingly, the network device performs decoding based on the bits in the indication information that carry the quantity of reference signals, to obtain the quantity of reference signals. The network device decodes, based on the quantity of reference signals, the bits in the indication information that are used to carry the X reference signal resource indexes and/or the Y pieces of RSRQ, to obtain the X reference signal resource indexes and/or the Y pieces of RSRQ.

It should be noted that the second part in the indication information includes the X reference signal resource indexes and/or the Y pieces of RSRQ. To be specific, if the indication information sent by the terminal to the network device includes only the X reference signal resource indexes, the first part in the indication information includes only the X reference signal resource indexes. If the indication information includes only the Y pieces of RSRQ, the first part in the indication information includes only the Y pieces of RSRQ. In other words, all content of the first part in the indication information and the second part are separately encoded.

Optionally, if the at least one reference signal in a $i^{th}$ reference signal group is one reference signal (for example, a first reference signal), that is, Li=1, RSRQ of the first reference signal may be determined based on a first RSRP and a first received signal strength indicator (received signal strength indicator, RSSI). The first RSRP is obtained by performing RSRP measurement on a reference signal resource on which the first reference signal is located; the first RSSI is obtained by performing RSSI measurement on the reference signal resource on which the first reference signal is located, or the first RSSI is obtained by performing RSSI measurement on reference signal resources on which the first reference signal and a second reference signal are located; and the second reference signal does not belong to a $i^{th}$ reference signal group.

For example, the terminal may alternatively perform RSSI measurement on the reference signal resource on which the first reference signal is located, to obtain the first RSSI, or the terminal may measure, on the reference signal resources on which the first reference signal and the second reference signal are located, interference caused by another cell to the terminal, to obtain the first RSSI. The terminal may perform RSRP measurement on the reference signal resource on which the first reference signal is located, to obtain the first RSRP, and further determine the RSRQ of the first reference signal based on the first RSSI and the first RSRP.

It should be noted that that the second reference signal does not belong to a $i^{th}$ reference signal group may be: The second reference signal does not belong to the N reference signal groups, or the second reference signal is a reference signal with a largest or smallest resource identifier in a $i^{th}$ cell group, or the second reference signal is a reference signal with a largest or smallest resource identifier in N cell groups, or the second reference signal is a reference signal with a largest or smallest resource identifier in the first cell group.

Optionally, the network device may preconfigure a reference signal resource used for RSRP measurement and/or a reference signal resource used for RSSI measurement, or may agree with the terminal in advance on a reference signal resource used for RSRP measurement and/or a reference signal resource used for RSSI measurement. This is not limited in this application.

For example, the network device may send configuration information. The configuration information indicates that the reference signal resource on which the first reference signal is located is used for RSRP measurement, and the reference signal resources on which the first reference signal and the second reference signal are located are used for RSSI measurement, or the reference signal resource on which the first reference signal is located is used for RSSI measurement.

Optionally, it is determined, based on the first RSSI and the first RSRP, that the first RSRQ of the first reference signal may be: First RSRQ=First RSRP/First RSSI.

Optionally, if the at least one reference signal in a $i^{th}$ reference signal group is one reference signal (for example, a first reference signal), that is, Li=1, a first SINR of the first reference signal may be determined based on first channel information and first interference information. The first channel information is obtained by performing channel measurement on a reference signal resource on which the first reference signal is located; the first interference information is obtained by performing interference measurement on a reference signal resource on which the first reference signal or a second reference signal is located; and the second reference signal does not belong to a $i^{th}$ reference signal group.

Optionally, it is determined, based on the first channel information S and the first interference information I, that the first SINR of the first reference signal may be: SINR=S/I.

Optionally, if the at least one reference signal in a $i^{th}$ reference signal group is a plurality of reference signals, that is, Li>1, second RSRQ of any reference signal (for example, the $j^{th}$ reference signal) in the Li reference signals may be determined based on a second RSRP and a second RSSI. The second RSRP is obtained by performing RSRP measurement on the $i^{th}$ reference signal; the second RSSI is obtained by performing RSSI measurement on reference signal resources on which the Li reference signals are located, or the second RSSI is obtained by performing RSSI measurement on reference signal resources on which the Li reference signals and a second reference signal are located; and the second reference signal is different from the Li reference signals in a $i^{th}$ reference signal group.

For example, the $j^{th}$ reference signal is the any one of the Li reference signals. In this way, corresponding RSRQ may be determined for each of the Li reference signals in a manner of determining the RSRQ of the $j^{th}$ reference signal. To avoid repetition, details are not described herein.

Optionally, Second RSRQ=(RSRP j)/(RSRP 1+RSRP 2+ . . . +RSRP j+I), where I includes interference caused by a cell other than cells in which the Li reference signals are located to the terminal, and may further include noise. Information about the interference may be obtained by measuring the interference by using one of the Li reference signals, or may be obtained through measurement by using the second reference signal.

Optionally, the noise may be obtained through measurement by using the Li reference signals. For example, after received signals, received quality, or received powers of every two reference signals in the Li reference signals are subtracted, results obtained after the subtraction are added and averaged, to obtain the noise.

It should be noted that a difference between measurement of the second RSSI and measurement of the first RSSI lies in that the second RSSI is obtained by performing RSSI measurement on the reference signal resources on which the Li reference signals are located, that is, mutual interference between the Li reference signals needs to be considered.

Figure 5:
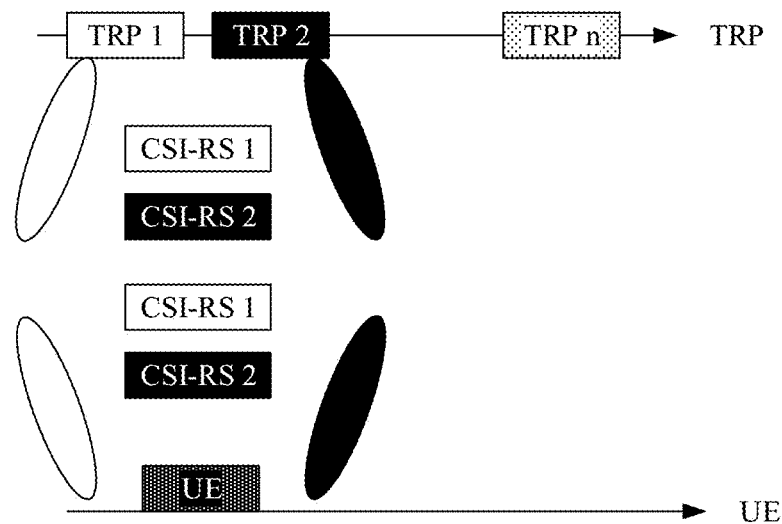
FIG. 5 is a schematic diagram of channel quality measurement.

For example, as shown in FIG. 5, an example in which Li=2 (namely, a CSI-RS 1 and a CSI-RS 2) is used for description. The terminal receives a signal y1 on a reference signal resource (CSI-RS 1) of the CSI-RS 1, where y1 is a sum of h1×s1 and h22×s2+I1+n. Herein, h1 represents a channel from a TRP 1 of the CSI-RS 1 to the terminal on the CSI-RS 1, h22 represents a channel from a TRP 2 to the terminal on the CSI-RS 1, s1 represents a reference signal 1, and s2 represents a reference signal 2. Herein, s1 is known information for the TRP 1 and the terminal, s2 is known information for the TRP 2 and the terminal, I1 represents interference (for example, a TRP n) that is from another cell and that is received by the terminal on the CSI-RS 1 other than the Li signals, and n represents noise. The terminal receives a signal y2 on a reference signal resource of the CSI-RS 2, where y2=h2×s2+h11×s1+I2+n. Herein, h2 is a channel coefficient from the TRP 2 of the CSI-RS 2 to the terminal on a time-frequency resource CSI-RS 2, and h22 is a channel coefficient from the TRP 1 of the CSI-RS 1 to the terminal on a time-frequency resource CSI-RS 1. Usually, h1=h11, and h2=h22. The terminal obtains a channel coefficient matrix h1 according to a channel estimation algorithm, and further obtains an RSRP 1 of h1 based on h1. Herein, RSRP 1=h1×h1$^H$ or h1$^H$×h1, and h1$^H$ is a transposed matrix of h1. Correspondingly, the terminal obtains an RSRP 2 of h2 based on h2. In this way, RSRQ of CSI-RS 1=RSRP 1/(RSRP 1+RSRP 2+I), and RSRQ of CSI-RS 2=RSRP 2/(RSRP 1+RSRP 2+I). Herein, I=(I1+n+I2+n)/2, I1+n is obtained by the terminal through measurement by using the CSI-RS 1, and I2+n is obtained by the terminal through measurement by using the CSI-RS 2.

Optionally, the interference may be obtained through measurement by using the CSI-RS 1, that is, I=I1+n. Optionally, the interference may be obtained through measurement by using the CSI-RS 2, that is, I=I2+n.

It should be noted that RSSI=RSRP 1+RSRP 2+I.

Optionally, it is determined, based on the second RSRP and the second RSSI, that the second RSRQ of the $j^{th}$ reference signal may be: Second RSRQ=Second RSRP/Second RSSI.

Optionally, if the at least one reference signal in a $i^{th}$ reference signal group is a plurality of reference signals, that is, Li>1, a second SINR of the $j^{th}$ reference signal in the Li reference signals may be determined based on second channel information and second interference information. The second channel information is obtained by performing channel measurement on a reference signal resource on which the $j^{th}$ reference signal is located; the second interference information is obtained by performing interference measurement on reference signal resources on which the Li reference signals are located, or the second interference information is obtained by performing interference measurement on a reference signal resource on which a reference signal other than the $j^{th}$ reference signal in the Li reference signals is located, or the second interference information is obtained by performing interference measurement on reference signal resources on which a reference signal other than the $j^{th}$ reference signal in the Li reference signals and a second reference signal are located; and the second reference signal is different from the Li reference signals in a $i^{th}$ reference signal group.

For example, the second RSSI is obtained by performing RSSI measurement on the reference signal resources on which the Li reference signals are located, that is, mutual interference between the Li reference signals needs to be considered, to accurately determine communication quality of each reference signal, and further improve communication quality. During measurement of the second RSSI, impact of another cell on the terminal further needs to be considered, to more accurately determine communication quality of each reference signal, and further improve communication quality.

Optionally, Second SINR=(Sj)/(S1+S2+ . . . +Sj+I), where I includes interference caused by a cell other than cells in which the Li reference signals are located to the terminal, and may further include noise. Information about the interference may be obtained by measuring the interference by using one of the Li reference signals, or may be obtained through measurement by using the second reference signal. Sj is channel information obtained through measurement by using the $j^{th}$ reference signal, or is referred to as a channel power.

It should be noted that the second reference signal may be a zero-power reference signal, or may be a non-zero-power reference signal. This is not limited in this application.

Optionally, if the at least one reference signal in a $i^{th}$ reference signal group is a plurality of reference signals, that is, Li>1, the terminal may determine one piece of equivalent RSRQ (for example, represented by using third RSRQ) based on Li third RSRPs and a third RSSI. The Li third RSRPs are obtained by performing RSRP measurement on a reference signal resource on which each of the Li reference signals is located; the third RSSI is obtained by performing RSSI measurement on reference signal resources on which the Li reference signals are located, or the third RSSI is obtained by performing RSSI measurement on reference signal resources on which the Li reference signals and a second reference signal are located; and the second reference signal does not belong to the N reference signal groups.

It should be understood that in this embodiment of this application, channel state information of the at least one reference signal in a $i^{th}$ reference signal group may be only one piece of equivalent RSRQ.

Optionally, the third RSRQ determined based on the Li third RSRPs and the third RSSI, may be determined based on a function relationship among the Li pieces of third RSRP, and the third RSSI. In other words, Third RSRQ=f(Li third RSRPs, third RSSI).

Optionally, if the at least one reference signal in a $i^{th}$ reference signal group is a plurality of reference signals, that is, Li>1, a third SINR may be determined based on Li pieces of third channel information and third interference information. The Li pieces of third channel information are obtained by performing channel measurement on a reference signal resource on which each of the Li reference signals is located; and the third interference information is obtained by performing interference measurement on reference signal resources on which the Li reference signals are located, or the third interference information is obtained by performing interference measurement on reference signal resources on which the Li reference signals and a second reference signal are located.

Optionally, if the at least one reference signal in a $i^{th}$ reference signal group is a plurality of reference signals, that is, Li>1, the terminal may determine fourth RSRQ based on a fourth RSRP and a fourth RSSI. The fourth RSRP is a maximum value in Li RSRPs that is obtained by performing RSRP measurement on each of the Li reference signals; the fourth RSSI is obtained by performing RSSI measurement on reference signal resources on which the Li reference signals are located, or the fourth RSSI is obtained by performing RSSI measurement on reference signal resources on which the Li reference signals and a second reference signal are located; and the second reference signal does not belong to the N reference signal groups.

For example, Fourth RSRP=max(RSRP 1, RSRP 2, . . . , and RSRP Li), and Fourth RSRQ=Fourth RSRP/Fourth RSSI.

It should be understood that in this embodiment of this application, channel state information of the at least one reference signal in a $i^{th}$ reference signal group may alternatively be only one piece of equivalent RSRQ.

Optionally, if the at least one reference signal in a $i^{th}$ reference signal group is a plurality of reference signals, that is, Li>1, a fourth SINR may be determined based on fourth channel information and fourth interference information. The fourth channel information is a maximum value in Li pieces of channel information that is obtained by performing channel measurement on a reference signal resource on which each of the Li reference signals is located; the fourth interference information is obtained by performing interference measurement on reference signal resources on which the Li reference signals are located, or the fourth interference information is obtained by performing interference measurement on reference signal resources on which the Li reference signals and a second reference signal are located; and the second reference signal is different from the Li reference signals in a $i^{th}$ reference signal group.

Therefore, according to the indication information transmission method in this embodiment of this application, the terminal receives the N reference signal groups, where each of the N reference signal groups includes M reference signals that are simultaneously received; and sends the indication information used to indicate the channel state information of the at least one reference signal in each of the K reference signal groups. Therefore, the terminal can feed back the channel state information of the reference signal in a scenario in which a plurality of reference signals can be simultaneously received, so that the network device selects a beam from a plurality of beams that can be simultaneously sent to send data. In this way, when a quantity of selected beams is greater than 1, communication efficiency is improved; when a beam with high communication quality is selected from the plurality of beams, communication quality can be improved; and when the channel state information of the at least one reference signal is fed back, if a quantity of the at least one reference signal is less than a total quantity of corresponding reference signal groups, signaling overheads can be reduced.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The foregoing describes in detail the channel state information transmission method according to the embodiments of this application. The following describes a channel state information transmission apparatus according to embodiments of this application.

Figure 6:
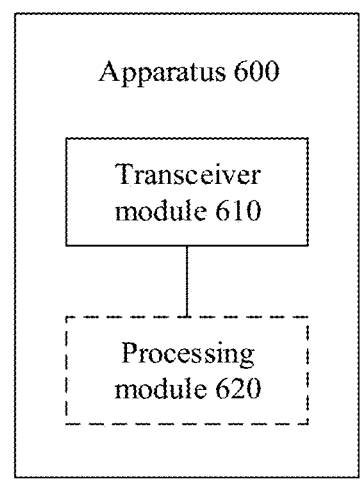
FIG. 6 is a schematic block diagram of a channel state information transmission apparatus according to an embodiment of this application.

FIG. 6 is a schematic block diagram of a channel state information transmission apparatus 600 according to an embodiment of this application.

It should be understood that the communications apparatus 600 may correspond to the terminal in the embodiment shown in FIG. 3, and may have any function of the terminal in the method. The communications apparatus 600 includes a transceiver module 610.

The transceiver module 610 is configured to receive N reference signal groups, where each of the N reference signal groups includes at least two reference signals, the at least two reference signals are reference signals that are simultaneously received, N≥1, and N is an integer.

The transceiver module 610 is further configured to send indication information, where the indication information indicates channel state information of at least one reference signal in each of K reference signal groups, the K reference signal groups are at least one of the N reference signal groups, 1≤K≤N, and K is an integer.

Optionally, the channel state information of the at least one reference signal in a $i^{th}$ reference signal group in the K reference signal groups is channel state information of Li reference signals, 1≤i≤K, 1≤Li≤M, i, Li, and M are all integers, M is a quantity of all reference signals included in a $i^{th}$ reference signal group, and the channel state information of the Li reference signals includes at least one of the following content:

X reference signal resource indexes, Y pieces of reference signal received quality RSRQ, or a quantity of reference signals, where X≤Li, and Y≤Li.

Optionally, the channel state information of the at least one reference signal in a $i^{th}$ reference signal group in the K reference signal groups is channel state information of Li reference signals, 1≤i≤K, 1≤Li≤M, i, Li, and M are all integers, M is a quantity of all reference signals included in a $i^{th}$ reference signal group, and the channel state information of the Li reference signals includes at least one of the following content:

X reference signal resource indexes, Z signal to interference plus noise ratios SINRs, or a quantity of reference signals, where X≤Li, and Z≤Li.

Optionally, the apparatus 600 further includes:
a processing module 620, configured to determine the K reference signal groups and/or the channel state information of the at least one reference signal in each of the K reference signal groups based on channel quality of reference signals in the N reference signal groups.

Optionally, the apparatus 600 further includes:
a processing module 620, configured to determine the K reference signal groups and/or the channel state information of the at least one reference signal in each of the K reference signal groups based on channel quality of reference signals in the N reference signal groups and a transmission mode.

Optionally, the apparatus 600 further includes:
a processing module 620, configured to determine the K reference signal groups and/or the channel state information of the at least one reference signal in each of the K reference signal groups based on a transmission mode.

Optionally, the processing module 620 is specifically configured to:
determine the K reference signal groups and/or the at least one reference signal in each of the K reference signal groups based on channel quality of at least one subset in each of at least one reference signal group in the N reference signal groups and the transmission mode.

Optionally, the processing module 620 is specifically configured to:
determine the K reference signal groups and/or the at least one reference signal in each of the K reference signal groups based on channel quality of at least one subset in each of at least one reference signal group in the N reference signal groups.

Optionally, the channel quality is RSRQ or an SINR.

Optionally, the processing module 620 is further configured to determine, when Li is equal to 1, first RSRQ of a first reference signal in a $i^{th}$ reference signal group based on a first reference signal received power RSRP and a first received signal strength indicator RSSI, where the first RSRP is obtained by performing RSRP measurement on a reference signal resource on which the first reference signal is located; the first RSSI is obtained by performing RSSI measurement on the reference signal resource on which the first reference signal is located, or the first RSSI is obtained by performing RSSI measurement on reference signal resources on which the first reference signal and a second reference signal are located; and the second reference signal is different from the Li reference signals in a $i^{th}$ reference signal group.

Optionally, the processing module 620 is further configured to determine, when Li is equal to 1, a first SINR of a first reference signal in a $i^{th}$ reference signal group based on first channel information and first interference information, where the first channel information is obtained by performing channel measurement on a reference signal resource on which the first reference signal is located; the first interference information is obtained by performing interference measurement on a reference signal resource on which the first reference signal or a second reference signal is located; and the second reference signal does not belong to a $i^{th}$ reference signal group.

Optionally, the processing module 620 is further configured to determine, when Li is greater than 1, RSRQ of the $j^{th}$ reference signal in the Li reference signals based on a second RSRP and a second RSSI, where the second RSRP is obtained by performing RSRP measurement on a reference signal resource on which the $j^{th}$ reference signal is located; the second RSSI is obtained by performing RSSI measurement on reference signal resources on which the Li reference signals are located, or the second RSSI is obtained by performing RSSI measurement on reference signal resources on which the Li reference signals and a second reference signal are located; the second reference signal is different from the Li reference signals in a $i^{th}$ reference signal group; and the $j^{th}$ reference signal is any one of the Li reference signals, and j is an integer.

Optionally, the processing module 620 is further configured to determine, when Li is greater than 1, an SINR of the $j^{th}$ reference signal in the Li reference signals based on second channel information and second interference information, where the second channel information is obtained by performing channel measurement on a reference signal resource on which the $j^{th}$ reference signal is located; the second interference information is obtained by performing interference measurement on reference signal resources on which the Li reference signals are located, or the second interference information is obtained by performing interference measurement on a reference signal resource on which a reference signal other than the $j^{th}$ reference signal in the Li reference signals is located, or the second interference information is obtained by performing interference measurement on reference signal resources on which a reference signal other than the $j^{th}$ reference signal in the Li reference signals and a second reference signal are located; the second reference signal is different from the Li reference signals in a $i^{th}$ reference signal group; and the $j^{th}$ reference signal is any one of the Li reference signals, and j is an integer.

Optionally, the processing module 620 is further configured to determine, when Li is greater than 1, third RSRQ based on Li third RSRPs and a third RSSI, where each of the Li third RSRPs is obtained by performing RSRP measurement on a reference signal resource on which each of the Li reference signals is located; the third RSSI is obtained by performing RSSI measurement on reference signal resources on which the Li reference signals are located, or the third RSSI is obtained by performing RSSI measurement on reference signal resources on which the Li reference signals and a second reference signal are located; and the second reference signal does not belong to the N reference signal groups.

Optionally, the processing module 620 is further configured to determine, when Li is greater than 1, the third SINR based on Li pieces of third channel information and third interference information, where each of the Li pieces of third channel information is obtained by performing channel measurement on a reference signal resource on which one of the Li reference signals is located; the third interference information is obtained by performing interference measurement on reference signal resources on which the Li reference signals are located, or the third interference information is obtained by performing interference measurement on reference signal resources on which the Li reference signals and a second reference signal are located; and the second reference signal is different from the Li reference signals in a $i^{th}$ reference signal group.

Optionally, the processing module 620 is further configured to determine fourth RSRQ based on a fourth RSRP and a fourth RSSI, where the fourth RSRP is a maximum value in Li RSRPs that is obtained by performing RSRP measurement on each of the Li reference signals; the fourth RSSI is obtained by performing RSSI measurement on reference signal resources on which the Li reference signals are located, or the fourth RSSI is obtained by performing RSSI measurement on reference signal resources on which the Li reference signals and a second reference signal are located; and the second reference signal does not belong to the N reference signal groups.

Optionally, the processing module 620 is further configured to determine, when Li is greater than 1, the fourth SINR based on fourth channel information and fourth interference information, where the fourth channel information is a maximum value in Li pieces of channel information that is obtained by performing channel measurement on a reference signal resource on which each of the Li reference signals is located; the fourth interference information is obtained by performing interference measurement on reference signal resources on which the Li reference signals are located, or the fourth interference information is obtained by performing interference measurement on reference signal resources on which the Li reference signals and a second reference signal are located; and the second reference signal is different from the Li reference signals in a $i^{th}$ reference signal group.

Optionally, the X reference signal resource indexes and/or the Y pieces of RSRQ in the indication information and the quantity of reference signals that is in the indication information are separately encoded; or the X reference signal resource indexes and/or the Z SINRs in the indication information and the quantity of reference signals that is in the indication information are separately encoded.

Optionally, X<Li when the Li reference signals have a mapping relationship.

Optionally, the transceiver module 610 is further configured to receive configuration information, where the configuration information indicates W resource sets used for channel measurement, each of the W resource sets includes a plurality of reference signals, and reference signals in a first resource set in the W resource sets are one-to-one mapped to reference signals in each of resource sets other than the first resource set in the W resource se; the first resource set is any one of the W resource sets; and W≥2, and W is an integer.

The apparatus 600 further includes:

The processing module 620 is configured to determine reference signals having a mapping relationship as one of the N reference signal groups.

Optionally, the transceiver module 610 is further configured to receive configuration information, where the configuration information indicates W resource configurations used for channel measurement, each of the W resource configurations includes a plurality of reference signal resources, and reference signal resources in a first resource configuration in the W resource configurations are one-to-one mapped to reference signal resources in each of resource configurations other than the first resource configuration in the With resource configuration; the first resource configuration is any one of the W resource configurations; and W≥2, and W is an integer.

The apparatus 600 further includes:

The processing module 620 is configured to determine reference signals having a mapping relationship as one of the N reference signal groups.

Therefore, the channel state information transmission apparatus in this embodiment of this application receives the N reference signal groups, where each of the N reference signal groups includes M reference signals that are simultaneously received; and sends the indication information used to indicate the channel state information of the at least one reference signal in each of the K reference signal groups. Therefore, the terminal can feed back the channel state information of the reference signal in a scenario in which a plurality of reference signals can be simultaneously received, so that a network device selects a beam from a plurality of beams that can be simultaneously sent to send data. In this way, when a quantity of selected beams is greater than 1, communication efficiency is improved; when a beam with high communication quality is selected from the plurality of beams, communication quality can be improved; and when the channel state information of the at least one reference signal is fed back, if a quantity of the at least one reference signal is less than a total quantity of corresponding reference signal groups, signaling overheads can be reduced.

Figure 7:
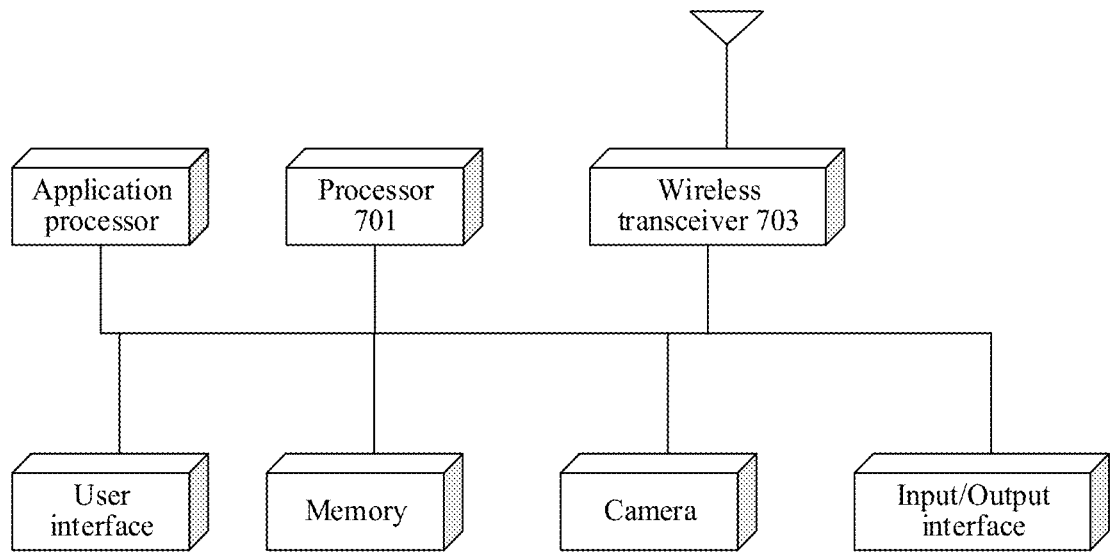
FIG. 7 is a schematic structural diagram of a channel state information transmission apparatus according to an embodiment of this application.

When the apparatus 600 in this embodiment is a terminal, the terminal may be of a structure shown in FIG. 7. The terminal includes a processor 701, an application processor, a memory user interface, and some other elements (including a device such as a power supply that is not shown). In FIG. 7, the processing module may be the processor 701, and completes a corresponding function. The sending module and/or the receiving module in the foregoing embodiment may be a wireless transceiver 703 in the figure. The wireless transceiver 703 completes a corresponding function by using an antenna. It may be understood that the elements shown in the figure are merely examples, and are not mandatory elements for implementing this embodiment.

Optionally, if the apparatus 600 is a chip in a terminal, the chip includes the transceiver module 610. The transceiver module 610 may be implemented by the transceiver 703, and the processing module 620 may be implemented by the processor 701. The transceiver module may be, for example, an input/output interface, a pin, or a circuit. The processing module can execute a computer executable instruction stored in a storage unit. The storage unit is a storage unit in the chip, for example, a register or a cache. The storage unit may alternatively be a storage unit that is in the terminal and that is located outside the chip, for example, a read-only memory (ROM), another type of static storage device that can store static information and an instruction, or a random access memory (RAM).

Figure 8:
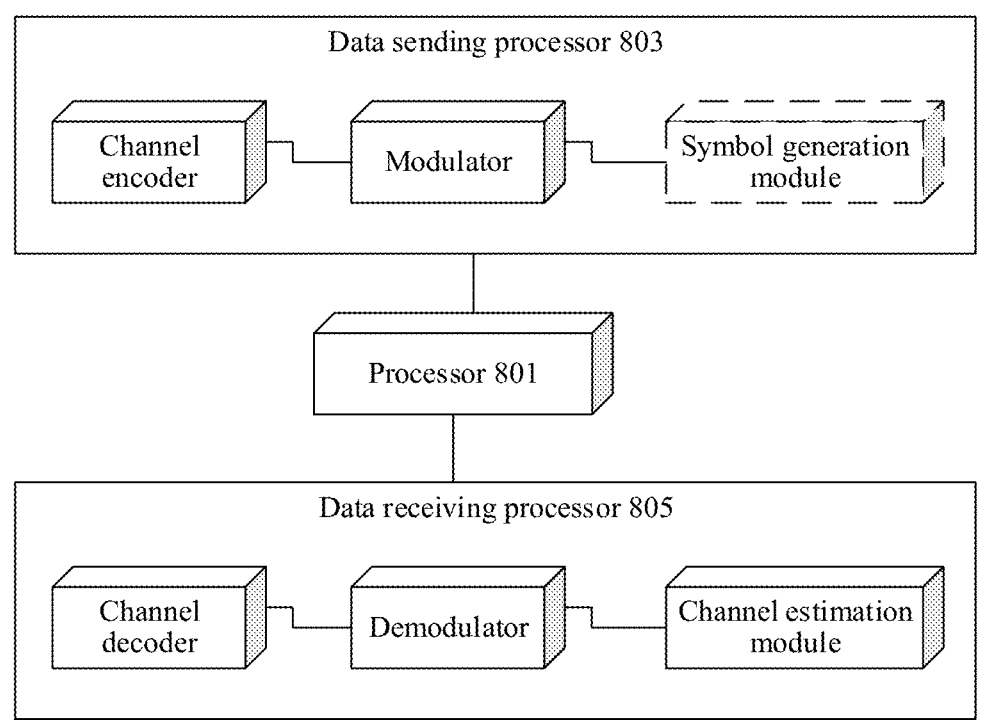
FIG. 8 is a schematic structural diagram of a channel state information transmission apparatus according to another embodiment of this application.

When the apparatus 600 in this embodiment is a terminal, the terminal may alternatively be of a structure shown in FIG. 8. In an example, the terminal can implement a function similar to a function of the processor in FIG. 7. In FIG. 8, the terminal includes a processor 801, a data sending processor, and a processor. In FIG. 8, the processing module 620 may be the processor 801, and completes a corresponding function. The transceiver module 610 may be the data sending processor 803 or the data receiving processor 805 in FIG. 8. Although a channel encoder and a channel decoder are shown in the figure, it may be understood that the modules are merely examples, and do not constitute a limitation on this embodiment.

Figure 9:
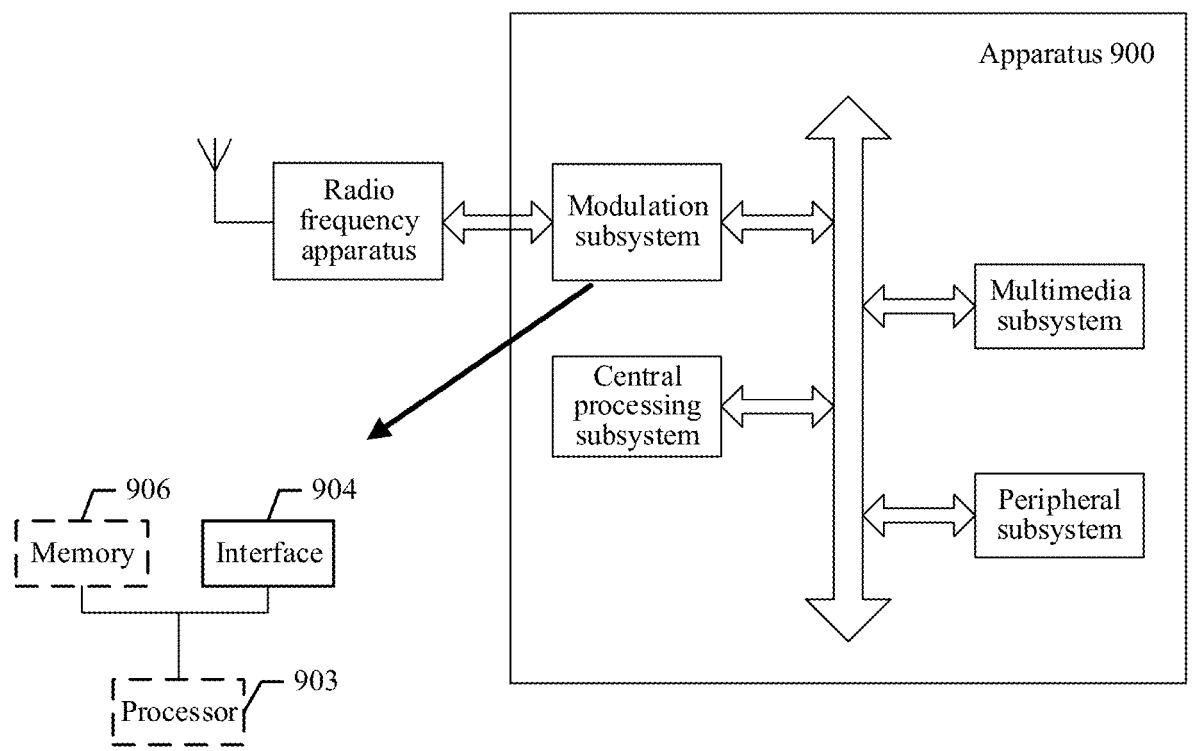
FIG. 9 is a schematic structural diagram of a channel state information transmission apparatus according to another embodiment of this application.

FIG. 9 shows another form of this embodiment. An apparatus 900 includes modules such as a modulation subsystem, a central processing subsystem, and a peripheral subsystem.

The apparatus 600 in this embodiment may be used as the modulation subsystem in the apparatus 900. Specifically, the modulation subsystem may include an interface 904. Optionally, the modulation subsystem may further include a processor 903. The processor 903 completes the function of the processing module 620, and the interface 904 completes the function of the transceiver module 610. In another form, the modulation subsystem includes a memory 906, a processor 903, and a program that is stored in the memory and that can be run on the processor. When executing the program, the processor implements the method according to one of Embodiment 1 to Embodiment 5. It should be noted that the memory 906 may be nonvolatile or volatile. The memory 906 may be located in the modulation subsystem, or may be located in the processing apparatus 900, provided that the memory 906 can be connected to the processor 903.

Figure 10:
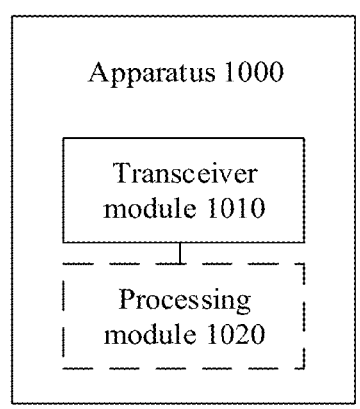
FIG. 10 is a schematic block diagram of a channel state information transmission apparatus according to an embodiment of this application.

FIG. 10 is a schematic block diagram of a channel state information transmission apparatus 1000 according to an embodiment of this application.

It should be understood that the communications apparatus 1000 may correspond to the network device in the method embodiment shown in FIG. 3, and may have any function of the communications device in the method. The communications apparatus 1000 includes a transceiver module 1010.

The transceiver module 1010 is configured to send N reference signal groups, where each of the N reference signal groups includes at least two reference signals, the at least two reference signals are reference signals that are simultaneously received, N≥1, and N is an integer.

The transceiver module 1010 is further configured to receive indication information, where the indication information indicates channel state information of at least one reference signal in each of K reference signal groups, the K reference signal groups are at least one of the N reference signal groups, 1≤K≤N, and K is an integer.

Optionally, the channel state information of the at least one reference signal in a $i^{th}$ reference signal group in the K reference signal groups is channel state information of Li reference signals, 1≤i≤K, 1≤Li≤M, i, Li, and M are all integers, M is a quantity of all reference signals included in a $i^{th}$ reference signal group, and the channel state information of the Li reference signals includes at least one of the following content: X reference signal resource indexes, Y pieces of reference signal received quality RSRQ, or a quantity of reference signals, where X≤Li, and Y≤Li.

Optionally, the channel state information of the at least one reference signal in a $i^{th}$ reference signal group in the K reference signal groups is channel state information of Li reference signals, 1≤i≤K, 1≤Li≤M, i, Li, and M are all integers, M is a quantity of all reference signals included in a $i^{th}$ reference signal group, and the channel state information of the Li reference signals includes at least one of the following content:

X reference signal resource indexes, Z signal to interference plus noise ratios SINRs, or a quantity of reference signals, where X≤Li, and Z≤Li.

Optionally, the X reference signal resource indexes and/or the Y pieces of RSRQ in the indication information and the quantity of reference signals that is in the indication information are separately encoded; or the X reference signal resource indexes and/or the Z SINRs in the indication information and the quantity of reference signals that is in the indication information are separately encoded.

Optionally, X<Li when the Li reference signals have a mapping relationship.

Optionally, the transceiver module 1010 is further configured to send configuration information, where the configuration information indicates W resource sets used for channel measurement, each of the W resource sets includes a plurality of reference signals, and reference signals in a first resource set in the W resource sets are one-to-one mapped to reference signals in each of resource sets other than the first resource set in the W resource set; the first resource set is any one of the W resource sets; and W≥2, and W is an integer.

Optionally, the transceiver module 1010 is further configured to send configuration information, where the configuration information indicates W resource configurations used for channel measurement, each of the W resource configurations includes a plurality of reference signal resources, and reference signal resources in a first resource configuration in the W resource configurations are one-to-one mapped to reference signal resources in each of resource configurations other than the first resource configuration in the $W^{th}$ resource configuration; the first resource configuration is any one of the W resource configurations; and W≥2, and W is an integer.

Therefore, according to the channel state information transmission apparatus in this embodiment of this application, the network device sends the N reference signal groups, where each of the N reference signal groups includes M reference signals that are simultaneously received; and receives the indication information used to indicate the channel state information of the at least one reference signal in each of the K reference signal groups. Therefore, the network device can receive, in a scenario in which a plurality of reference signals can be simultaneously received, the channel state information that is of the reference signal and that is sent by a terminal, and selects a beam from a plurality of beams that can be simultaneously sent to send data. In this way, when a quantity of selected beams is greater than 1, communication efficiency is improved; when a beam with high communication quality is selected from the plurality of beams, communication quality can be improved; and when the channel state information of the at least one reference signal is fed back, if a quantity of the at least one reference signal is less than a total quantity of corresponding reference signal groups, signaling overheads can be reduced.

It should be understood that the communications apparatus 1000 according to this embodiment of this application may correspond to the network device in the channel state information transmission method in the embodiment shown in FIG. 3, and the foregoing and other management operations and/or functions of the modules in the communications apparatus 1000 are respectively used to implement corresponding steps of the foregoing methods. For brevity, details are not described herein again.

Figure 11:
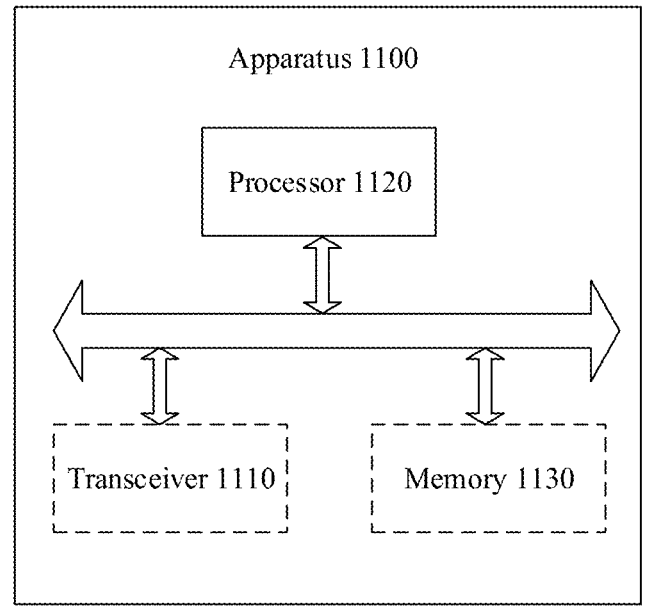
FIG. 11 is a schematic structural diagram of a channel state information transmission apparatus according to an embodiment of this application.

Optionally, if the communications apparatus 1000 is a network device, the transceiver module 1010 in this embodiment of this application is configured to: receive or send information. The transceiver module 1010 may be implemented by a transceiver. Alternatively, when the transceiver module is configured to receive a signal, the transceiver module may be implemented by a receiver. When the transceiver module is configured to transmit a signal, the transceiver module may be implemented by a transmitter. The transceiver module 1010 may alternatively be a communications port or an interface circuit, to receive and send signals of another module in the communications apparatus or signals of another apparatus outside the apparatus 1000. The another apparatus may be a communications device. As shown in FIG. 11, an apparatus 1100 includes a transceiver 1110. Optionally, the apparatus 1100 further includes a processor 1120 and a memory 1130. The memory 1130 may be configured to store indication information, and may be further configured to store code, an instruction, and the like that are executed by the processor 1120. The transceiver may include a radio frequency circuit. Optionally, the network device further includes a storage unit.

The storage unit may be, for example, the memory. When the network device includes the storage unit, the storage unit is configured to store a computer executable instruction. The processing module 1020 is connected to the storage unit. The processing module 1020 executes the computer executable instruction stored in the storage unit, so that the network device performs the signal processing method.

Optionally, if the signal processing apparatus 1000 is a chip in a network device, the chip includes a transceiver module 1010. Optionally, the chip further includes a processing module 1020. As shown in FIG. 11, the transceiver module 1010 may be implemented by the transceiver 1110, and the processing module 1020 may be implemented by the processor 1120. The transceiver module 1010 may be, for example, an input/output interface, a pin, or a circuit on the chip. The processing module 1020 can execute a computer executable instruction stored in a storage unit. The storage module is a storage module in the chip, for example, a register or a cache. The storage module may alternatively be a storage module that is in the communications device and that is located outside the chip, for example, a read-only memory (ROM), another type of static storage device that can store static information and an instruction, or a random access memory (RAM).

Optionally, the processor in the foregoing embodiments may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in the embodiments of the present invention. The general-purpose processor may be a microprocessor, or the processor may be any conventional processor or the like. The steps of the methods disclosed with reference to the embodiments of the present invention may be directly performed and completed by a hardware decoding processor, or performed and completed by a combination of hardware and a software module in a decoding processor. A software module may be located in a mature storage medium in the art, such as a random access memory (RAM), a flash memory, a read-only memory (ROM), a programmable read-only memory, an electrically erasable programmable memory, a register, or the like.

Figure 12:
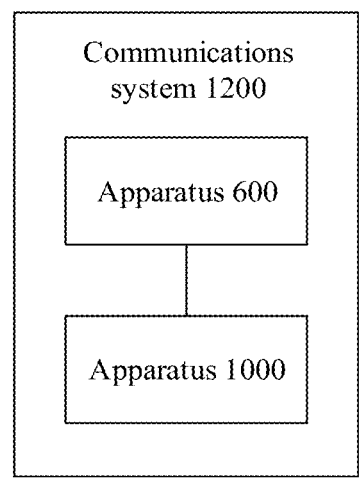
FIG. 12 is a schematic block diagram of a communications system according to an embodiment of this application.

FIG. 12 shows a communications system 1200 according to an embodiment of this application. The communications system 1200 includes:

the channel state information transmission apparatus 600 in the embodiment shown in FIG. 6 and the channel state information transmission apparatus 1000 in the embodiment shown in FIG. 10.

In another form of this embodiment, a computer readable storage medium is provided. The computer readable storage medium stores an instruction. When the instruction is executed, a program instruction in any one of the foregoing methods is executed.

In another form of this embodiment, a computer program product including an instruction is provided. When the computer program product is run on a computer, the computer is enabled to perform any one of the foregoing methods.

A person of ordinary skill in the art may be aware that units, algorithms, and steps in the examples described with reference to the embodiments disclosed in this specification can be implemented by electronic hardware or a combination of computer software and electronic hardware. Whether the functions are performed by hardware or software depends on a particular application and a design constraint of the technical solutions. A person skilled in the art may use different methods to implement a described function for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, and may be located at one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    obtaining N reference signal groups, wherein each of the N reference signal groups comprises at least two reference signals, the at least two reference signals are reference signals that are simultaneously received, N≥1, and N is an integer; and
    sending indication information, wherein the indication information indicates channel state information of at least one reference signal in each of K reference signal groups, the K reference signal groups are at least one of the N reference signal groups, 1≤K≤N, and K is an integer,
    wherein the channel state information of the at least one reference signal in a $i^{th}$ reference signal group in the K reference signal groups is channel state information of Li reference signals, 1≤i≤K, 1≤Li≤M, i, Li, and M are all integers, M is a quantity of all reference signals comprised in the $i^{th}$ reference signal group, and the channel state information of the Li reference signals comprises at least one of the following content:
    X reference signal resource indexes, Y pieces of reference signal received quality (RSRQ), Z signal to interference plus noise ratios (SINRs), or a quantity of reference signals, wherein X≤Li, and Y≤Li, and Z≤Li.

2. The method according to claim 1, wherein the method further comprises:
    determining one or more of the K reference signal groups and the channel state information of the at least one reference signal in each of the K reference signal groups based on channel quality of reference signals in the N reference signal groups; or
    determining one or more of the K reference signal groups and the channel state information of the at least one reference signal in each of the K reference signal groups based on channel quality of reference signals in the N reference signal groups and a transmission mode; or
    determining one or more of the K reference signal groups and the channel state information of the at least one reference signal in each of the K reference signal groups based on a transmission mode.

3. The method according to claim 1, wherein when Li is equal to 1, and the method further comprises:
    determining a first RSRQ of a first reference signal in the $i^{th}$ reference signal group based on a first reference signal received power (RSRP) and a first received signal strength indicator (RSSI), wherein the first RSRP is obtained by performing RSRP measurement on a reference signal resource on which the first reference signal is located; the first RSSI is obtained by performing RSSI measurement on the reference signal resource on which the first reference signal is located, or the first RSSI is obtained by performing RSSI measurement on reference signal resources on which the first reference signal and a second reference signal are located; and the second reference signal is different from the Li reference signals in the $i^{th}$ reference signal group; or
    determining a first SINR of a first reference signal in the $i^{th}$ reference signal group based on first channel information and first interference information, wherein the first channel information is obtained by performing channel measurement on a reference signal resource on which the first reference signal is located; the first interference information is obtained by performing interference measurement on a reference signal resource on which the first reference signal or a second reference signal is located; and the second reference signal is different from the Li reference signals in the $i^{th}$ reference signal group.

4. The method according to claim 1, wherein when Li is greater than 1, and the method further comprises:
    determining RSRQ of a $j^{th}$ reference signal in the Li reference signals based on a second RSRP and a second RSSI, wherein the second RSRP is obtained by performing RSRP measurement on a reference signal resource on which the $j^{th}$ reference signal is located; the second RSSI is obtained by performing RSSI measurement on reference signal resources on which the Li reference signals are located, or the second RSSI is obtained by performing RSSI measurement on reference signal resources on which the Li reference signals and a second reference signal are located; the second reference signal is different from the Li reference signals in the $i^{th}$ reference signal group; and the $j^{th}$ reference signal is any one of the Li reference signals, and j is an integer; or
    determining an SINR of the $j^{th}$ reference signal in the Li reference signals based on second channel information and second interference information, wherein the second channel information is obtained by performing channel measurement on a reference signal resource on which the $j^{th}$ reference signal is located; the second interference information is obtained by performing interference measurement on reference signal resources on which the Li reference signals are located, or the second interference information is obtained by performing interference measurement on a reference signal resource on which a reference signal other than the $j^{th}$ reference signal in the Li reference signals is located, or the second interference information is obtained by performing interference measurement on reference signal resources on which a reference signal other than the $j^{th}$ reference signal in the Li reference signals and a second reference signal are located; the second reference signal is different from the Li reference signals in the $i^{th}$ reference signal group; and the $j^{th}$ reference signal is any one of the Li reference signals, and j is an integer.

5. The method according to claim 1, wherein one or more of the X reference signal resource indexes and the Y pieces of RSRQ in the indication information and the Z SINRs in the indication information and the quantity of reference signals that is in the indication information are separately encoded.

6. The method according to claim 1, wherein X<Li when the Li reference signals have a mapping relationship.

7. A method, comprising:
sending N reference signal groups, wherein each of the N reference signal groups comprises at least two reference signals, the at least two reference signals are reference signals that are simultaneously received, N≥1, and N is an integer; and
receiving indication information, wherein the indication information indicates channel state information of at least one reference signal in each of K reference signal groups, the K reference signal groups are at least one of the N reference signal groups, 1≤K≤N, and K is an integer,
wherein the at least one reference signal in a $i^{th}$ reference signal group in the K reference signal groups is Li reference signals, 1≤i≤K, 1≤Li≤M, i, Li, and M are all integers, M is a quantity of all reference signals comprised in the $i^{th}$ reference signal group, and channel state information of the Li reference signals comprises at least one of the following content:
X reference signal resource indexes, Y pieces of reference signal received quality (RSRQ), Z signal to interference plus noise ratios (SINRs), or a quantity of reference signals, wherein X≤Li, and Y≤Li, and Z≤Li.

8. The method according to claim 7, wherein one or more of the X reference signal resource indexes and the Y pieces of RSRQ in the indication information and the Z SINRs in the indication information and the quantity of reference signals that is in the indication information are separately encoded.

9. The method according to claim 7, wherein X<Li when the Li reference signals have a mapping relationship.

10. The method according to claim 7, wherein the method further comprises:
sending configuration information, wherein the configuration information indicates W resource sets used for channel measurement, each of the W resource sets comprises a plurality of reference signals, and reference signals in a first resource set in the W resource sets are one-to-one mapped to reference signals in each of resource sets other than the first resource set in a $W^{th}$ resource set; the first resource set is any one of the W resource sets; and W≥2, and W is an integer.

11. The method according to claim 7, wherein the method further comprises:
sending configuration information, wherein the configuration information indicates W resource configurations used for channel measurement, each of the W resource configurations comprises a plurality of reference signal resources, and reference signal resources in a first resource configuration in the W resource configurations are one-to-one mapped to reference signal resources in each of resource configurations other than the first resource configuration in the W resource configuration; the first resource configuration is any one of the W resource configurations; and W≥2, and W is an integer.

12. An apparatus, comprising:
a transceiver, configured to receive N reference signal groups, wherein each of the N reference signal groups comprises at least two reference signals, the at least two reference signals are reference signals that are simultaneously received, N≥1, and N is an integer, wherein
the transceiver is configured to send indication information, wherein the indication information indicates channel state information of at least one reference signal in each of K reference signal groups, the K reference signal groups are at least one of the N reference signal groups, 1≤K≤N, and K is an integer,
wherein the at least one reference signal in a $i^{th}$ reference signal group in the K reference signal groups is Li reference signals, 1≤i≤K, 1≤Li≤M, i, Li, and M are all integers, M is a quantity of all reference signals comprised in the $i^{th}$ reference signal group, and channel state information of the Li reference signals comprises at least one of the following content:
X reference signal resource indexes, Y pieces of reference signal received quality (RSRQ), Z signal to interference plus noise ratios (SINRs) or a quantity of reference signals, wherein X≤Li, and Y≤Li, and Z≤Li.

13. The apparatus according to claim 12, wherein the apparatus further comprises:
at least one processor, configured to:
determine one or more of the K reference signal groups and the channel state information of the at least one reference signal in each of the K reference signal groups based on channel quality of reference signals in the N reference signal groups; or
to determine one or more of the K reference signal groups and the channel state information of the at least one reference signal in each of the K reference signal groups based on channel quality of reference signals in the N reference signal groups and a transmission mode; or
to determine one or more of the K reference signal groups and the channel state information of the at least one reference signal in each of the K reference signal groups based on a transmission mode.

14. The apparatus according to claim 12, wherein the apparatus further comprises:
at least one processor, configured to:
determine, when Li is equal to 1, first RSRQ of a first reference signal in the $i^{th}$ reference signal group based on a first reference signal received power (RSRP) and a first received signal strength indicator (RSSI), wherein the first RSRP is obtained by performing RSRP measurement on a reference signal resource on which the first reference signal is located; the first RSSI is obtained by performing RSSI measurement on the reference signal resource on which the first reference signal is located, or the first RSSI is obtained by performing RSSI measurement on reference signal resources on which the first reference signal and a second reference signal are located; and the second reference signal is different from the Li reference signals in the $i^{th}$ reference signal group; or
determine, when Li is equal to 1, a first SINR of a first reference signal in the $i^{th}$ reference signal group based on first channel information and first interference information, wherein the first channel information is obtained by performing channel measurement on a reference signal resource on which the first reference signal is located; the first interference information is obtained by performing interference measurement on a reference signal resource on which the first reference signal or a second reference signal is located; and the second reference signal does not belong to the $i^{th}$ reference signal group.

15. The apparatus according to claim 12, wherein the apparatus further comprises:
    at least one processor, configured to:
    determine, when Li is greater than 1, RSRQ of a $j^{th}$ reference signal in the Li reference signals based on a second reference signal received power (RSRP) and a second received signal strength indicator (RSSI), wherein the second RSRP is obtained by performing RSRP measurement on a reference signal resource on which the $j^{th}$ reference signal is located; the second RSSI is obtained by performing RSSI measurement on reference signal resources on which the Li reference signals are located, or the second RSSI is obtained by performing RSSI measurement on reference signal resources on which the Li reference signals and a second reference signal are located; the second reference signal is different from the Li reference signals in the $i^{th}$ reference signal group; and the $j^{th}$ reference signal is any one of the Li reference signals, and j is an integer; and
    determine, when Li is greater than 1, an SINR of the $j^{th}$ reference signal in the Li reference signals based on second channel information and second interference information, wherein the second channel information is obtained by performing channel measurement on a reference signal resource on which the $j^{th}$ reference signal is located; the second interference information is obtained by performing interference measurement on reference signal resources on which the Li reference signals are located, or the second interference information is obtained by performing interference measurement on a reference signal resource on which a reference signal other than the $j^{th}$ reference signal in the Li reference signals is located, or the second interference information is obtained by performing interference measurement on reference signal resources on which a reference signal other than the $j^{th}$ reference signal in the Li reference signals and a second reference signal are located; the second reference signal is different from the Li reference signals in the $i^{th}$ reference signal group; and the $j^{th}$ reference signal is any one of the Li reference signals, and j is an integer.

16. The apparatus according to claim 12, wherein one or more of the X reference signal resource indexes and the Y pieces of RSRQ in the indication information and the Z SINRs in the indication information and the quantity of reference signals that is in the indication information are separately encoded.

17. The apparatus according to claim 12, wherein X<Li when the Li reference signals have a mapping relationship.

* * * * *